United States Patent
Weber et al.

(10) Patent No.: US 11,981,252 B1
(45) Date of Patent: May 14, 2024

(54) LIGHT BAR ASSEMBLY FOR A VEHICLE

(71) Applicant: NISSAN NORTH AMERICA, INC., Franklin, TN (US)

(72) Inventors: William J. Weber, Brighton, MI (US); Dale Butterworth, Brighton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 18/307,623

(22) Filed: Apr. 26, 2023

(51) Int. Cl.
    *B60Q 1/26*     (2006.01)
    *F21S 4/28*     (2016.01)

(52) U.S. Cl.
CPC ........ *B60Q 1/2623* (2013.01); *B60Q 2400/40* (2013.01); *F21S 4/28* (2016.01)

(58) Field of Classification Search
CPC .... B60Q 1/2623; B60Q 1/325; B60Q 1/2661; B60Q 1/2696; B60Q 2400/40; B60Q 2400/50
See application file for complete search history.

(56) References Cited

U.S. PATENT DOCUMENTS

| | | | |
|---|---|---|---|
| 4,456,275 A * | 6/1984 | Snyder | B60R 3/002 182/92 |
| 4,463,962 A * | 8/1984 | Snyder | B60Q 1/325 362/495 |
| 4,557,494 A | 12/1985 | Elwell | |
| 5,915,830 A * | 6/1999 | Dickson | B60R 3/002 362/559 |
| 6,250,785 B1 | 6/2001 | Mallia et al. | |
| 8,235,568 B2 | 8/2012 | Heiden et al. | |
| 9,162,614 B1 | 10/2015 | Wang | |
| 10,604,064 B2 | 3/2020 | Kuhl et al. | |
| 10,775,016 B1 * | 9/2020 | Salter | F21S 43/26 |
| 11,117,510 B2 | 9/2021 | Weber et al. | |
| 2007/0274087 A1 * | 11/2007 | Herold | B60Q 1/2657 362/546 |
| 2011/0211362 A1 * | 9/2011 | Heiden | B60Q 1/247 362/520 |
| 2012/0280528 A1 * | 11/2012 | Dellock | B60R 13/04 362/516 |
| 2013/0229820 A1 * | 9/2013 | Jutila | F21S 43/14 362/545 |
| 2016/0090026 A1 * | 3/2016 | Oliverio | B60Q 1/0035 362/543 |
| 2018/0162266 A1 * | 6/2018 | Hoek | B60R 3/002 |
| 2021/0046863 A1 * | 2/2021 | Weber | B60Q 1/2615 |
| 2022/0068056 A1 * | 3/2022 | Weber | B60Q 1/0035 |
| 2023/0125300 A1 * | 4/2023 | Meyers | G03B 21/2006 315/32 |

* cited by examiner

*Primary Examiner* — Alexander K Garlen
(74) *Attorney, Agent, or Firm* — Global IP Counselors, LLP

(57) ABSTRACT

A light bar assembly for a vehicle. The light bar assembly including a light bar and a first bracket assembly. The light bar configured to receive a light source. The first bracket assembly including a first light bar receiving portion and a first rocker attachment portion. The first light bar receiving portion being configured to receive a first portion of the light bar. The first rocker attachment portion being configured to receive a first portion of a vehicle rocker.

18 Claims, 20 Drawing Sheets

LIGHT BAR ASSEMBLY FOR A VEHICLE

BACKGROUND

Technical Field

The present disclosure generally relates to a light bar assembly for a vehicle. More specifically, the present disclosure relates to a light bar assembly for a vehicle in which a first bracket assembly includes a first rocker attachment portion that is configured to clamp to a vehicle rocker.

Background Information

A light bar assembly for a vehicle illuminates an external area in the vicinity of the vehicle. The light bar assembly includes a light bar including a plurality of light sources that emit light to the external area. A first bracket assembly secures the light bar to a vehicle structure. Existing light bar assemblies can project light at different angles when they are installed on multiple vehicle types.

SUMMARY

In view of the state of the known technology, one aspect of the present disclosure is to provide a light bar assembly for a vehicle. The light bar assembly includes a light bar and a first bracket assembly. The light bar is configured to receive a light source. The first bracket assembly includes a first light bar receiving portion and a first rocker attachment portion. The first light bar receiving portion is configured to receive a first portion of the light bar. The first rocker attachment portion is configured to receive a first portion of a vehicle rocker.

Also, other objects, features, aspects and advantages of the disclosed vehicle light bar assembly will become apparent to those skilled in the art from the following detailed description, which, taken in conjunction with the annexed drawings, discloses exemplary embodiments of the vehicle light bar assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
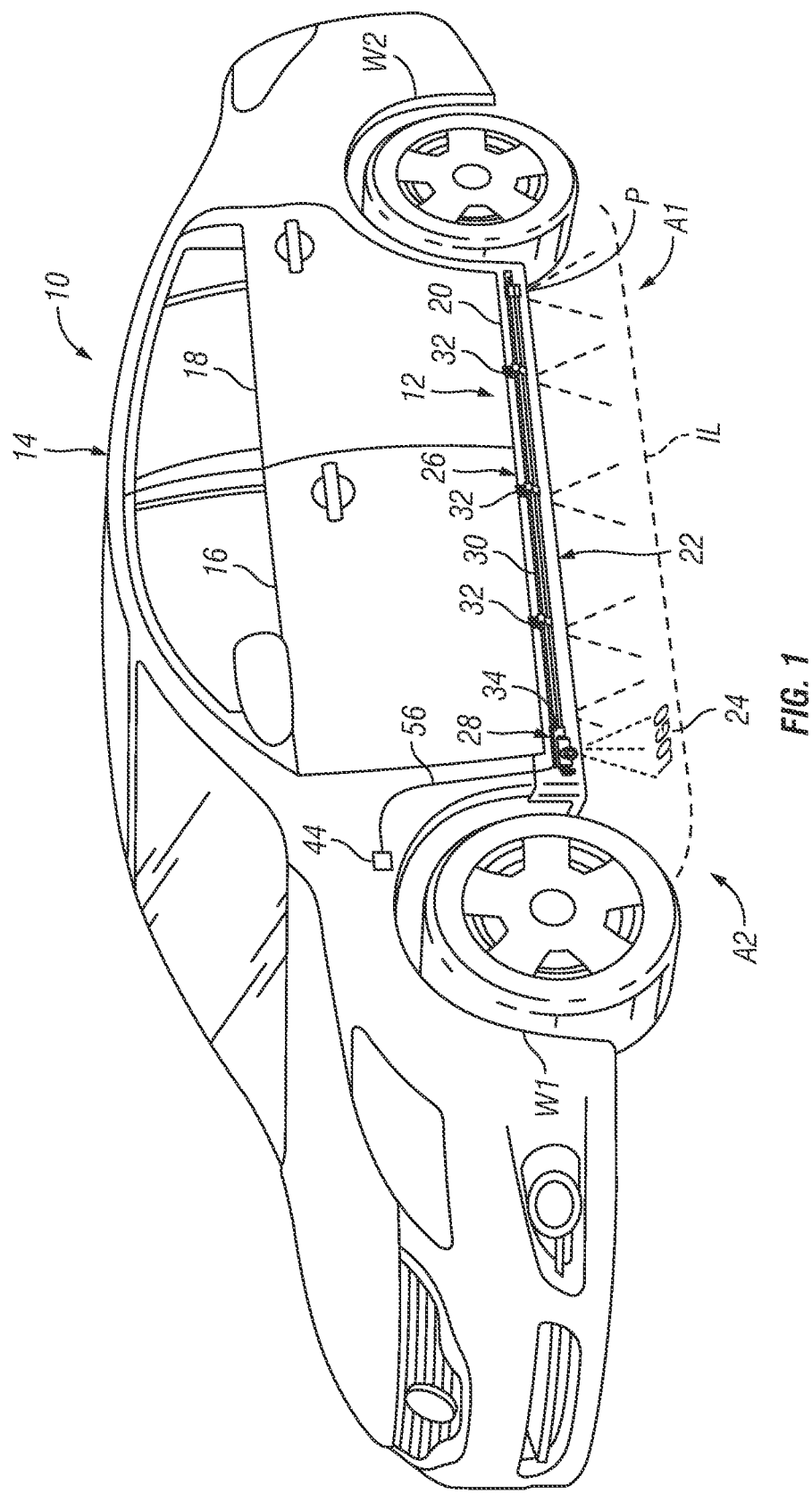
FIG. 1 is a perspective view of a vehicle equipped with a vehicle light bar bracket assembly in accordance with an exemplary embodiment.

Referring now to FIG. 1, a vehicle 10 equipped with a light bar assembly 12 is illustrated according to an exemplary embodiment. The vehicle 10 includes a vehicle body structure 14, a front door 16 (illustrated as a driver side), a rear door 18 (illustrated as the driver side), and a rocker panel 20. In the illustrated embodiment, the rocker panel, or sill, 20, which includes a rocker trim panel, is considered a component of the vehicle body structure 14 that at least partially defines an underbody 22 of the vehicle 10. Although the light bar assembly 12 is illustrated as being disposed on the driver side of the vehicle 10, it will be apparent to those skilled in the vehicle field from this disclosure that the rocker panel 20 and the vehicle 10 can include an additional rocker panel 20 (not shown) extending along a passenger side or a rear end, which can be similarly equipped with components of the light bar assembly 12 of the illustrated embodiment.

The underbody 22 defines an outer perimeter P of the vehicle 10. The light bar assembly 12 draws electrical power from an electrical system of the vehicle 10.

The light bar assembly 12 illuminates an illuminated area IL external of the vehicle 10. The illuminated area IL is preferably located beneath the underbody 22 and also in the vicinity of the outer perimeter P of the vehicle 10. The illuminated area IL can extend the length of a side of the vehicle 10 and can encompass the area located directly beneath the underbody 22, the area located inboard of the perimeter P and the area located outboard of the perimeter P. Therefore, the illuminated area IL can include the ground that is located beneath the underbody 22 and in the vicinity of the outer perimeter P of the vehicle 10. While the illuminated area IL is illustrated as being projected near the driver side of the vehicle 10, it will be apparent to those skilled in the vehicle field that the light bar assembly 12 can be implemented with the passenger side to illuminate the ground in the vicinity of the passenger side of the vehicle 10. It will be further apparent to those skilled in the vehicle field from this disclosure that while the light bar assembly 12 is illustrated as illuminating the ground in the vicinity of the driver side doors, it will be apparent to those skilled in the vehicle field from this disclosure that the light bar assembly 12 can illuminate different external areas that are in the vicinity of the vehicle 10 as needed and/or desired.

The light bar assembly 12 of the exemplary embodiment can be considered an underglow light assembly or ground effects that is attached to the underbody 22 or beneath the chassis of the vehicle 10. The light bar assembly 12 is preferably connected to the vehicle underbody 22 and disposed inboard of the rocker panel 20. The light bar assembly 12 can be disposed in any suitable location of the vehicle 10. The light bar assembly 12 projects light towards the illuminated area IL. The light bar assembly 12 is oriented and/or constructed to illuminate the illuminated area IL either alone or in combination with the exterior lights (e.g., taillights or parking lights) of the vehicle 10. It will be apparent to those skilled in the vehicle field from this disclosure that the light bar assembly 12 can be implemented to illuminate the illuminated area IL by itself or in combination with other exterior lights of the vehicle 10.

The rocker panel, or sill, 20 is a rigid panel preferably made of a durable material, such as stamped steel. The rocker panel 20 extends longitudinally along the front and rear doors 16 and 18 and is disposed below the front and rear doors 16 and 18. The rocker panel 20 extends between a front wheel well W1 and a rear wheel well W2 along the bottom sides of the vehicle 10. The rocker panel 20 forms the juncture of the underbody 22 with the front and rear doors 16 and 18 and at least partially defines the outer perimeter P of the vehicle 10. It will be apparent to those skilled in the vehicle field that the vehicle 10 additionally includes a passenger side rocker panel (not shown) that also at least partially defines the outer perimeter P of the vehicle 10. The rocker panel trim is a rigid piece of plastic or metal trim that is placed over the rocker panel 20. The rocker panel trim is fixedly attached to the rocker panel 20 by any suitable fastening means to conceal or cover all or a portion of the rocker panel 20.

The light bar assembly 12 is disposed on one or both sides, and/or at a rear of the vehicle 10 as needed and/or desired. The light bar assembly 12 operates to illuminate the illuminated area IL that is the vicinity of the rocker panel 20. The light bar assembly 12 of the exemplary embodiment is mounted at the underbody 22 of the vehicle 10 for illuminating the illuminated area IL in the vicinity of the vehicle 10.

Figure 2:
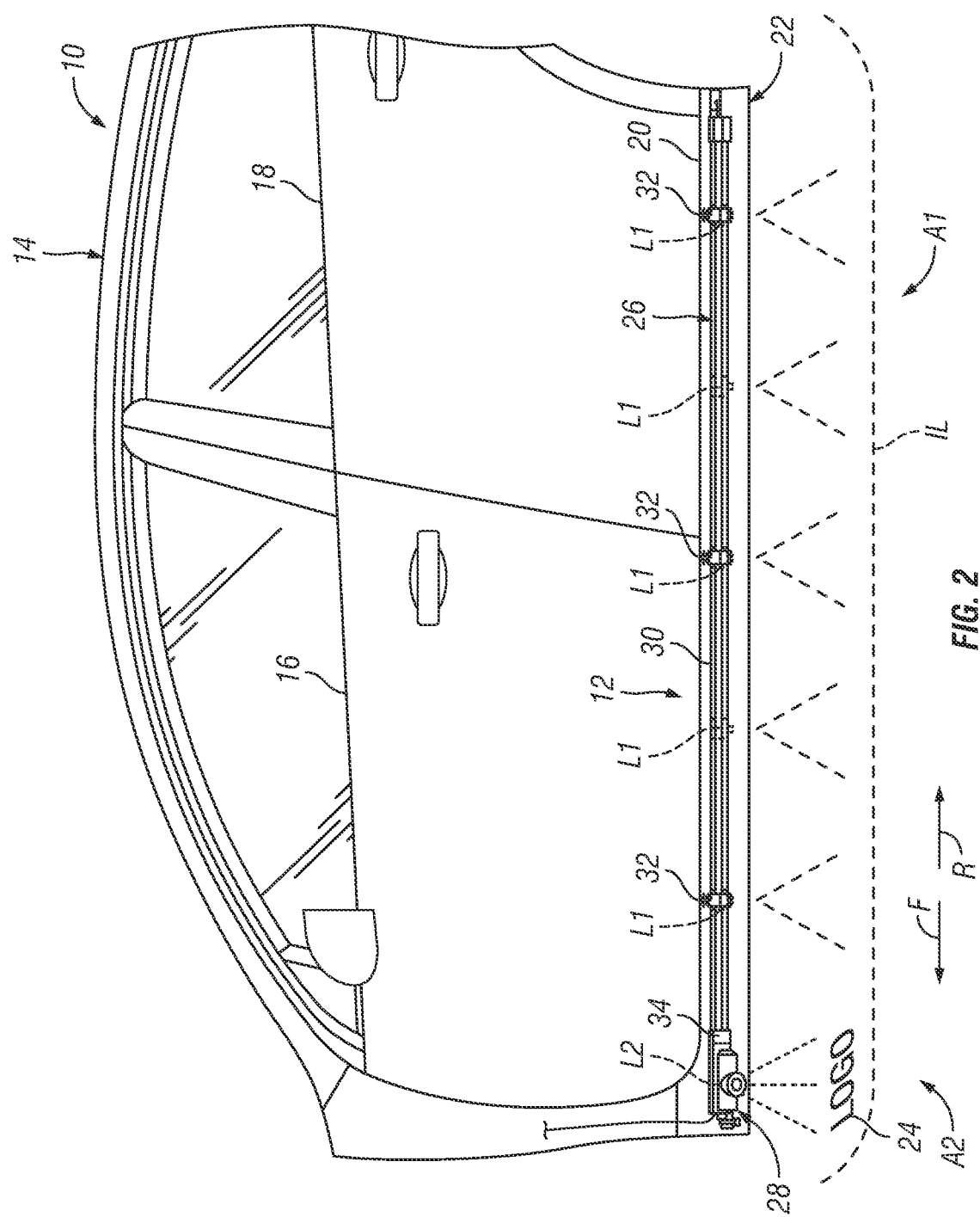
FIG. 2 is a side elevational view of the vehicle light assembly including a vehicle light bar bracket assembly of FIG. 1.
Figure 3:
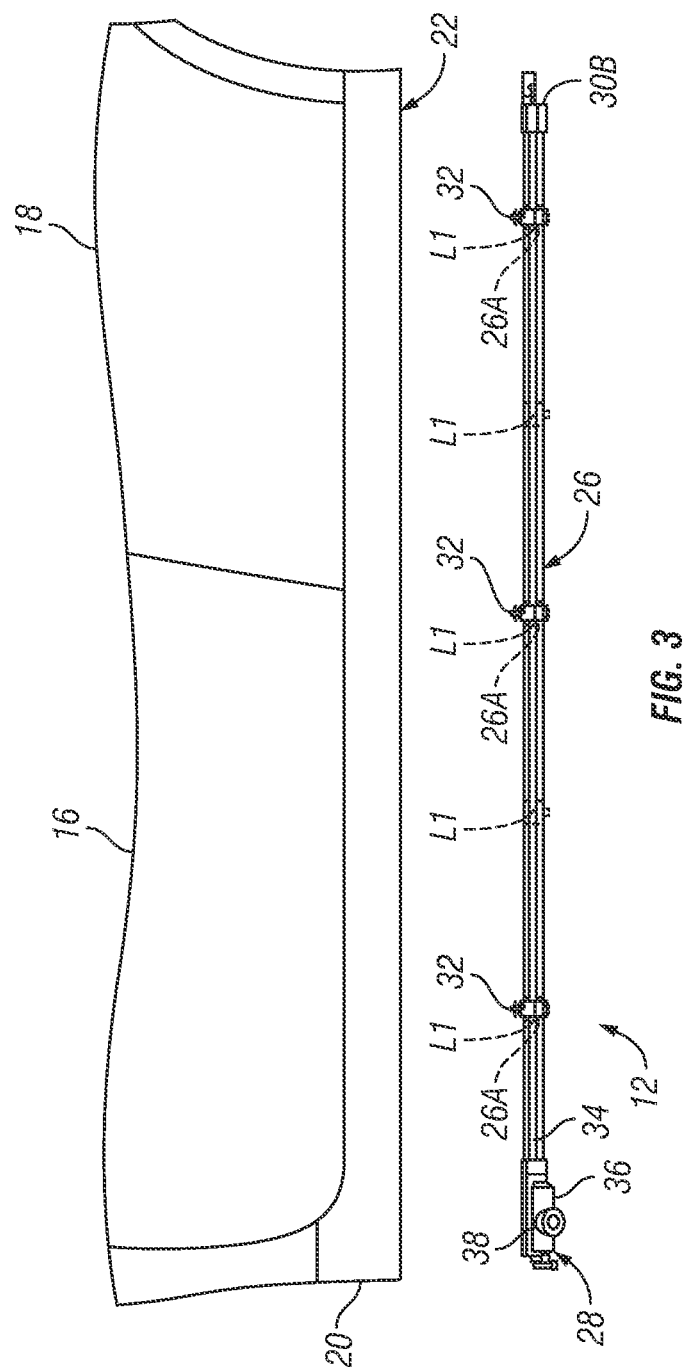
FIG. 3 is an exploded side elevational view of the vehicle of FIG. 1 prior to installation of the vehicle light assembly to the vehicle.

Referring to FIGS. 2 and 3, the light bar assembly 12 includes a light bar 26 and an image projector 28. The light bar 26 includes a fixed structure 30 and a plurality of light sources L1 that are long-life LEDs disposed on the fixed structure 30 via base members 26A. The light sources L1 are preferably shielded in the base members 26A by rubber isolators (not shown) configured to reduce vibrations and improve component life. Therefore, the light bar 26 includes at least one light source L1 that is preferably an LED. The light bar 26 preferably includes a plurality of light sources that are LEDs. The light sources L1 can be surface-mounted LEDs configured to emit light with any of a variety of colors, color temperatures, or other properties.

The light bar 26 is configured to illuminate a first external area A1 that is in the vicinity of the vehicle 10, as shown in FIGS. 1 and 2. The first external area A1 is part of the illuminated area IL. The fixed structure 30 of the light bar 26 is preferably configured to be assembled to the rocker panel 20, as shown in FIGS. 1-3 and 10. Alternatively, the fixed structure 30 is configured to be assembled to a suitable component of the vehicle body 14. The fixed structure 30 is preferably an elongated member extending in a longitudinal direction of the vehicle 10. The light sources L1 are distributed along a longitudinal length of the fixed structure 30. The light sources L1 are fixed to the fixed structure 30 and are configured to illuminate the first external area A1 that is in the vicinity of the vehicle 10. The fixed structure 30 is connected to the rocker panel 20 by at least one bracket assembly 32. Preferably, three bracket assemblies 32 are equidistantly spaced along the fixed structure 30 of the light bar 26, as shown in FIG. 3. The fixed structure 30 is made of any suitable material, such as extruded aluminum. The bracket assembly 32 is made of any suitable material, such as steel, such as fourteen gauge steel sheet metal.

The fixed structure 30 can also be configured to function as an auxiliary mounting component for the light bar assembly 12. For example, the fixed structure 30 can emit and/or distribute light produced by the light sources L1 of the light bar assembly 12. The fixed structure 30 can also include features for effecting a light distribution of the light bar assembly 12. For example, the fixed structure 30 can be configured to distribute the light produced by the light sources L1 and projected towards the first external area A1. For example, the fixed structure 30 can include one or more angled facet(s) that can distribute light produced by the light sources L1 at different desired angles. Additionally, the fixed structure 30 can include reflective material to deflect light across the underbody 22 and around the outer perimeter P of the vehicle. In the illustrated embodiment, while the light bar 26 is illustrated as including five light sources L1 distributed along the fixed structure 30, it will be apparent to those skilled in the vehicle field from this disclosure that any suitable number and spacing of the light sources L1 of the light bar assembly 12 can be used.

The light sources L1 are connected to the fixed structure 30, and the image projector 28 is connected to an end of the fixed structure 30, as shown in FIGS. 1-7 and 10. The image projector 28 is fixed to the fixed structure 30 and is configured to project an image 24 onto a second external area A2. In the exemplary embodiment, the image projector 28 is a logo projector that projects a logo or emblem (e.g., the projected image) 24 of the vehicle 10. However, it will be apparent to those in the vehicle field from this disclosure that the image projector 28 can project other types of images (e.g., the date or time information) and/or messages (e.g., "welcome").

The image projector 28 is configured to project an image in the second external area A2 that is in the vicinity of the first external area A1, as shown in FIGS. 1 and 2. The first and second external areas A1 and A2 are adjacent to each other. Additionally, the first and second external areas A1 and A2 can overlap with one another. In other words, the image projector 28 can project the image onto an area that is illuminated by the light bar 26. The second external area A2 is part of the illuminated area IL. The light sources L1 of the light bar 26 and the light sources L2 of the image projector 28 are configured to illuminate the first and second external areas A1 and A2 in concert.

The image projector 28 is fixed to the light bar 26, as shown in FIGS. 1-7 and 10. The light bar 26 includes an end cap 34 that is connected to the fixing structure 30 at a longitudinal end 30A thereof. The image projector 28 is fixed to the end cap 34 connected to the longitudinal end 30A of the fixed structure 30 by conventional means, such as by a fastener 48. The fastener 48 is preferably a bolt connecting the image projector 28 to the end cap 34 of the light bar 26. As shown, the end cap 34 is connected to a forward longitudinal end of the fixed structure 30 of the light bar 26. The end cap 34 is made of any suitable material, such as cast aluminum.

The image projector 28 is connected to the end cap 34 disposed at the forward end of the fixed structure 30 of the light bar 26. As shown in FIGS. 1-3, the image projector 28 and the end cap 34 are preferably disposed below the driver side door 16. It will be apparent to those skilled in the vehicle field from this disclosure that the image projector 28 can be alternatively, or additionally, fixed to a rearward end 30B of the light bar 26. It will also be apparent to those skilled in the vehicle field from this disclosure that the length and location of the light bar 26 can vary such that the location of the image projector 28 will also vary with respect to the underbody 22.

Figure 4:
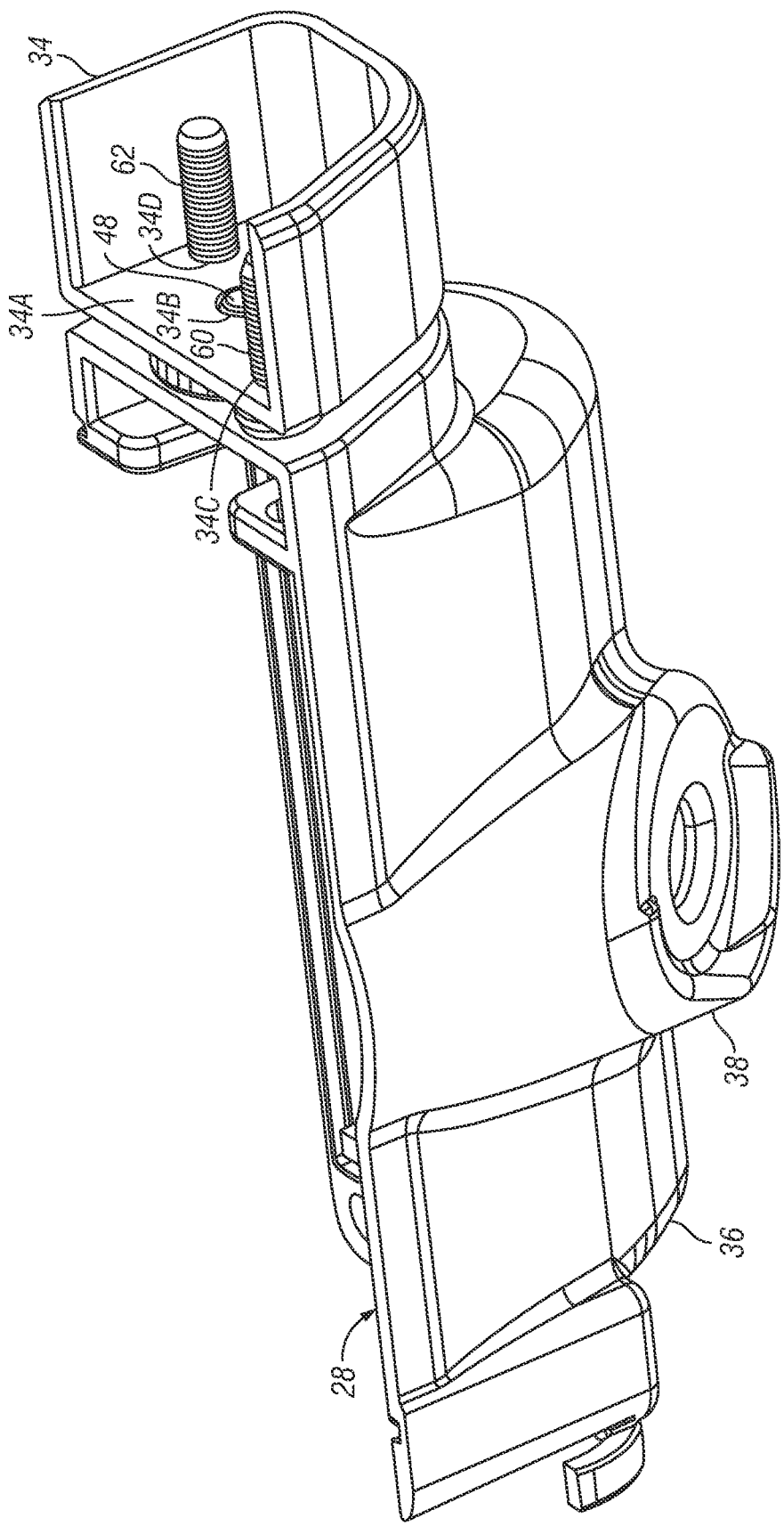
FIG. 4 is a perspective view of a projector connected to an end cap of the vehicle light assembly of FIG. 1.
Figure 5:
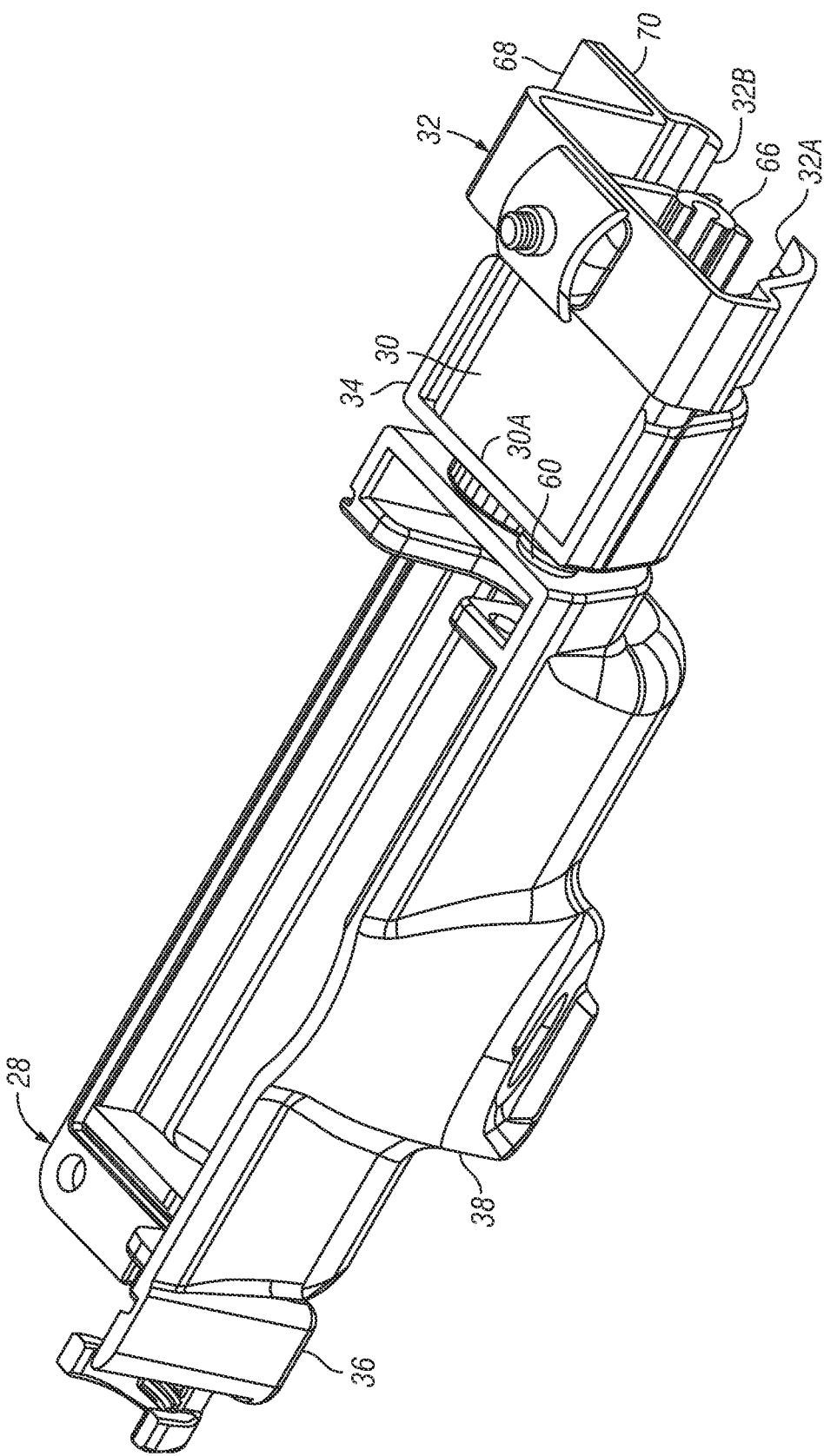
FIG. 5 is a perspective view of the projector connected to the end cap of FIG. 4 with a light bar received by the end cap and a bracket assembly connected to the light bar.

The image projector 28 includes a housing 36 having an emitting portion 38 projecting at an angle with respect to a vertical line perpendicular to the ground, as shown in FIGS. 4 and 5. The housing 36 houses a light source L2 that illuminates the image projected by the image projector 28. The housing 36 is made of any suitable material, such as cast aluminum.

In the exemplary embodiment, the light source L2 of the image projector 28 is preferably an LED. The housing 36 of the image projector 28 further houses a circuit board (not shown) that mechanically supports and electrically connects the light source L2 to an electric control module 44 (FIG. 1) of the lighting system of the vehicle 10. The circuit board can be conventional and include one or more layers of copper laminated onto a non-conductive substrate. The circuit board is electrically connected to the electric control module (ECU) 44 of the lighting system, as will be further explained below. The circuit board is electrically connected to the projector light source L2 of the image projector 28 to regulate electric current transferred from the electric control module 44 to the projector light source L2 of the image projector 28. The projector light source L2 of the image projector 28 preferably emits at least one beam with a wavelength between 15 and 1100 nanometers of visible light.

The image projector 28 includes a lens stack (not shown) that is downstream of the projector light source L2 in a direction in which light is emitted by the light source L2. The lens stack is a set of optics that are transparent plates with a nanometric surface treatment, such as etchings. The etchings provide a diffuse reflection on one side of the plates but not on the other to facilitate the passing of consistent light beams in a particular order. The image projector 28 generates the projected image as projected laser light. The image projector 28 further includes a protective lens (not shown) downstream of the lens stack. The protective lens can include reflective material disposed at a portion of the outer surface of the lens to deflect light that would otherwise be wasted across the underbody 22 of the vehicle 10. The image that is projected can be imprinted onto the surface protective lens. For example, the logo 24 (FIGS. 1 and 2) that is to be projected can be painted or imprinted onto the protective lens.

Referring to FIG. 1, the electric control module or electric control unit 44 electrically controls the components of the light bar assembly 12. Specifically, the electric control module 44 electrically controls the light bar light sources L1 of the light bar 26 and the projector light source L2 of the image projector 28. As illustrated, the electric control module 44 is part of the light bar assembly 12. The electric control module 44 preferably includes a microcomputer that includes one or more processor(s) and one or more storage device(s) (i.e., a computer memory device). The memory is any computer storage device or any computer readable medium with the sole exception of a transitory, propagating signal. For example, the memory can be nonvolatile memory and volatile memory, and can includes a ROM (Read Only Memory) device, a RAM (Random Access Memory) device, a hard disk, a flash drive, etc. The storage device can be any a non-transitory computer readable medium such as a ROM (Read Only Memory) device, a RAM (Random Access Memory) device, a hard disk, a flash drive, etc. The storage device is configured to store settings, programs, data, calculations and/or results of the processor(s).

The electric control module 44 is electrically connected to the light bar 26 and the image projector 28. The electric control module 44 provides electrical power to both the light bar 26 and the image projector 28. The electric control module 44 is electrically connected to and electrically operates the light sources L1 and L2 of the light bar 26 and the image projector 28. The electric control module 44 is electrically connected to the light sources L1 and L2 of the light bar 26 and the image projector 28 and to the image projector circuit board by electrical wiring 56, as shown in FIG. 1. The light bar light sources L2 of the light bar 26 and the projector light source L2 of the image projector 28 are configured to activate at substantially the same time to illuminate the illuminated area IL. Additionally, the light bar assembly 12 preferably activates at the same time as the interior map lights such that the illuminated area IL is illuminated when the interior map lights turn on. Preferably, the light bar light sources L2 of the light bar 26 and the projector light source L2 of the image projector 28 are configured to turn off along with the interior map lights after a predetermined time period. Alternatively, the light bar light sources L2 of the light bar 26 and the projector light source L2 of the image projector 28 of the light bar assembly 12 and the interior map lights turn off automatically in concert when the vehicle ignition is turned on.

Figure 7:
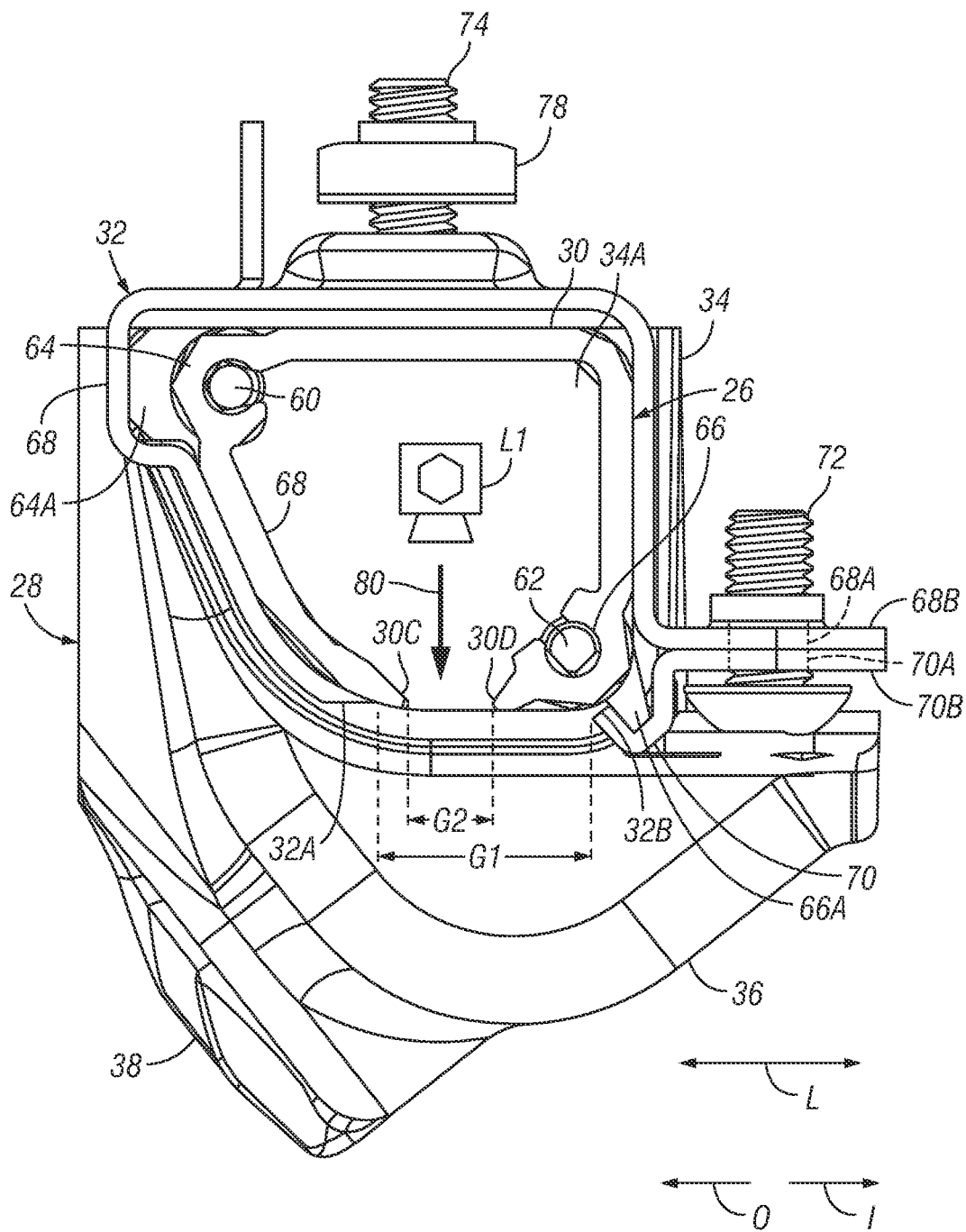
FIG. 7 is an elevational view of the light bar bracket assembly connected to the light bar of FIG. 6.

As shown in FIGS. 1-3 and 10, the light bar 26 of the light bar assembly 12 is configured to be connected to the vehicle body structure 14 of the vehicle 10. The projector 28 is connected to the light bar 26. As shown in FIG. 7, an axial face 34A of the end cap 34 includes a first fastener opening 34B configured to receive the fastener 48 to secure the end cap 34 to the projector 28. As shown in FIG. 7, first and second fasteners 60 and 62 secure the end cap 34 to the fixed structure 30 of the light bar 26. The first and second fasteners 60 and 62 preferably do not engage the housing 36 of the projector 28. The fastener 48 secures the projector 28 to the end cap 34, which is connected to the fixed structure 30 of the light bar 26 by the first and second fasteners 60 and 62. The axial face 34A of the end cap 34A includes first and second fastener openings 34C and 34D configured to receive the first and second fasteners 60 and 62. The axial face 34A of the end cap 34 and the projector housing 36 can further include aligned openings to pass the electrical wiring 56 therethrough.

Figure 6:
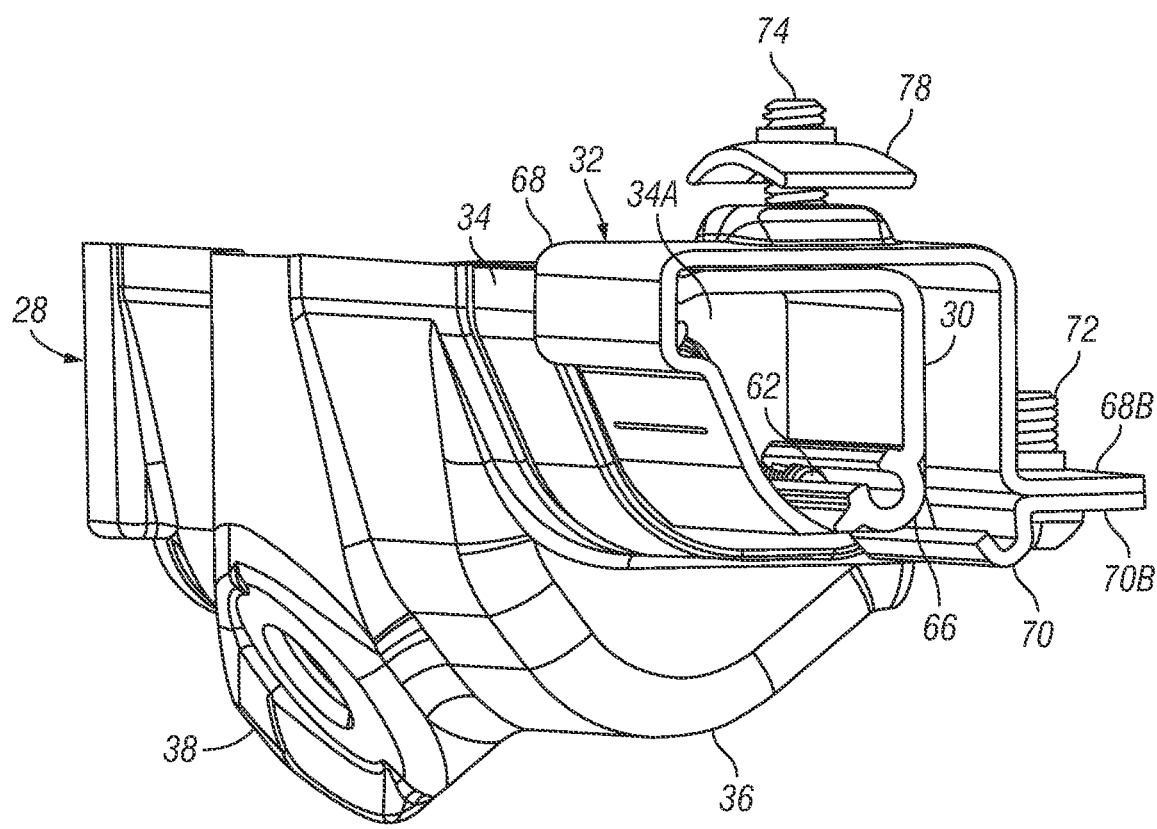
FIG. 6 is a perspective view of the light bar bracket assembly connected to the light bar of FIG. 5.

As shown in FIG. 7, the fixed structure 30 of the light bar 26 includes a first fastener receiving channel 64 and a second fastener receiving channel 66 configured to receive the first and second fasteners 60 and 62, respectively, to secure the end cap 34 to the fixed structure 30 of the light bar 26, as shown in FIGS. 6 and 7. The first and second fastener receiving channels 64 and 66 are integrally formed with the fixed structure 30. Each of the first and second fastener receiving channels 64 and 66 includes a strengthening portion 64A and 66A that extends outwardly therefrom. The strengthening portions 64A and 66A are integrally formed with the fixed structure 30. The first and second fasteners 60 and 62 are preferably inserted through the axial face 34A of the end cap 34 and into the first and second fastener receiving channels 64 and 66, respectively, of the fixed structure 30 of the light bar 26.

Figure 9:
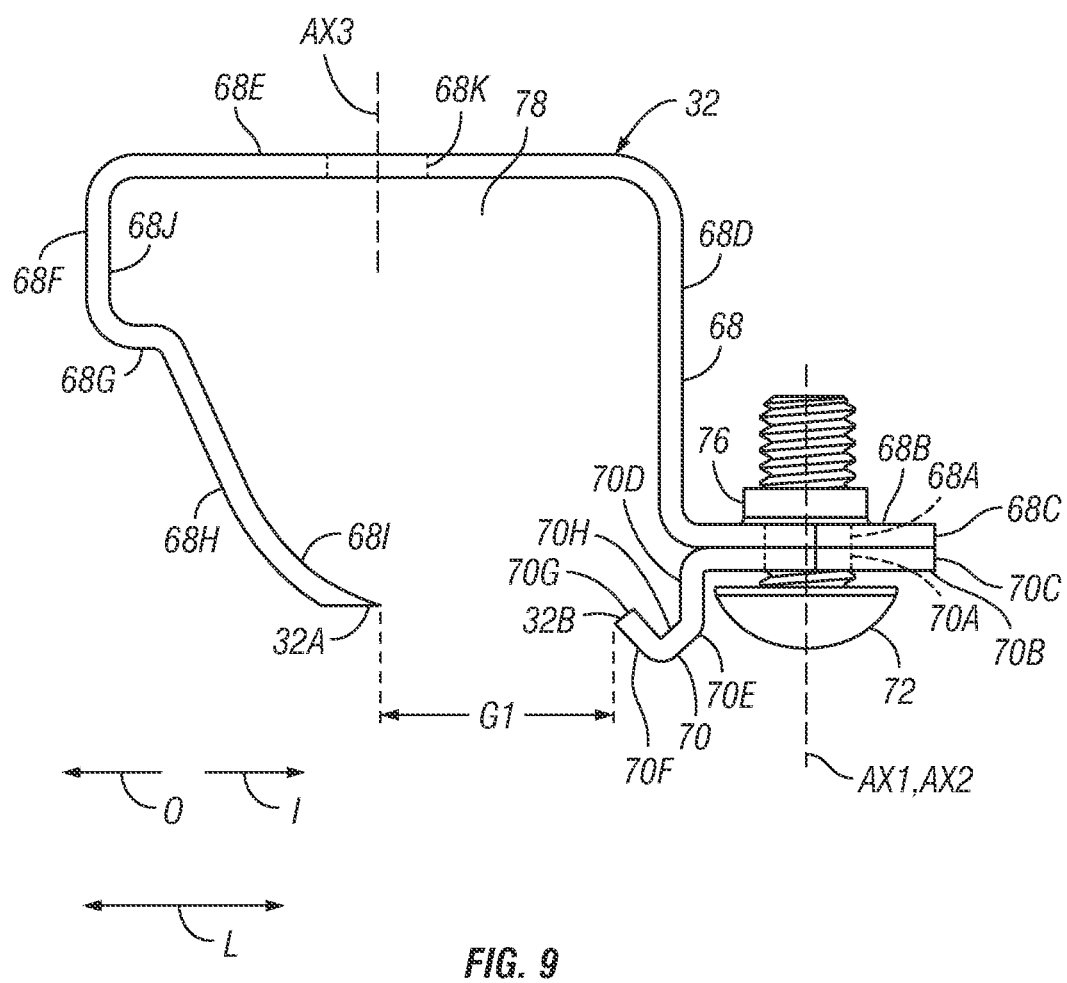
FIG. 9 is an elevational view of the light bar bracket assembly of FIG. 8.
Figure 10:
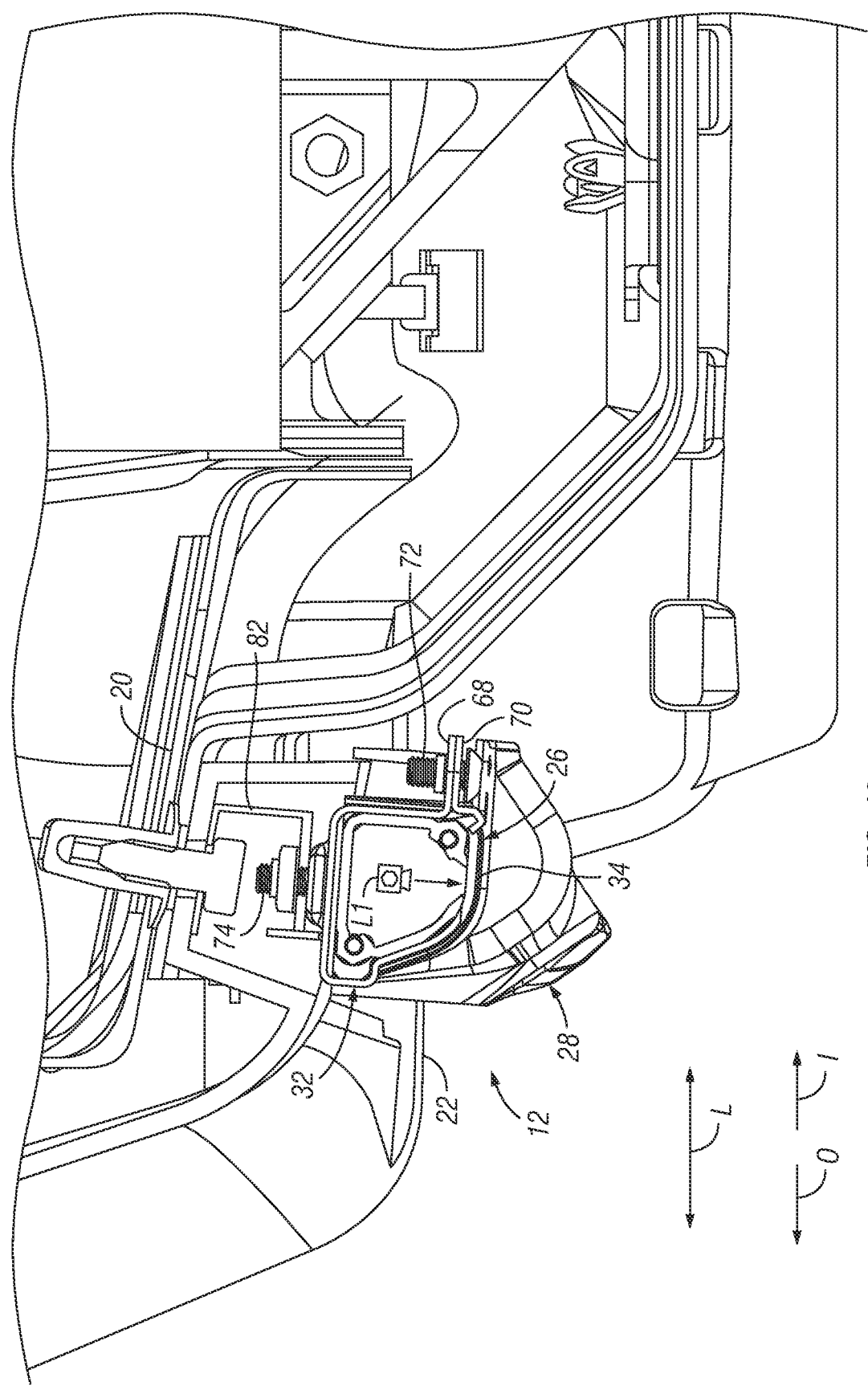
FIG. 10 is an elevational view in cross section of the light bar bracket assembly connected to the vehicle of FIG. 1.

The bracket assembly 32 is configured to receive the fixed structure 30 of the light bar 26, as shown in FIGS. 6, 7 and 10. A gap G1, as shown in FIGS. 7 and 9, is defined between a first end 32A and a second end 32B of the bracket assembly 32 through which light is configured to be emitted by the light source L1. The gap G1 between the first and second ends 32A and 32B of the bracket assembly 32 facilitates emitting light from the light source L1. The gap G1 preferably extends substantially continuously in a longitudinal direction of the vehicle.

Figure 8:
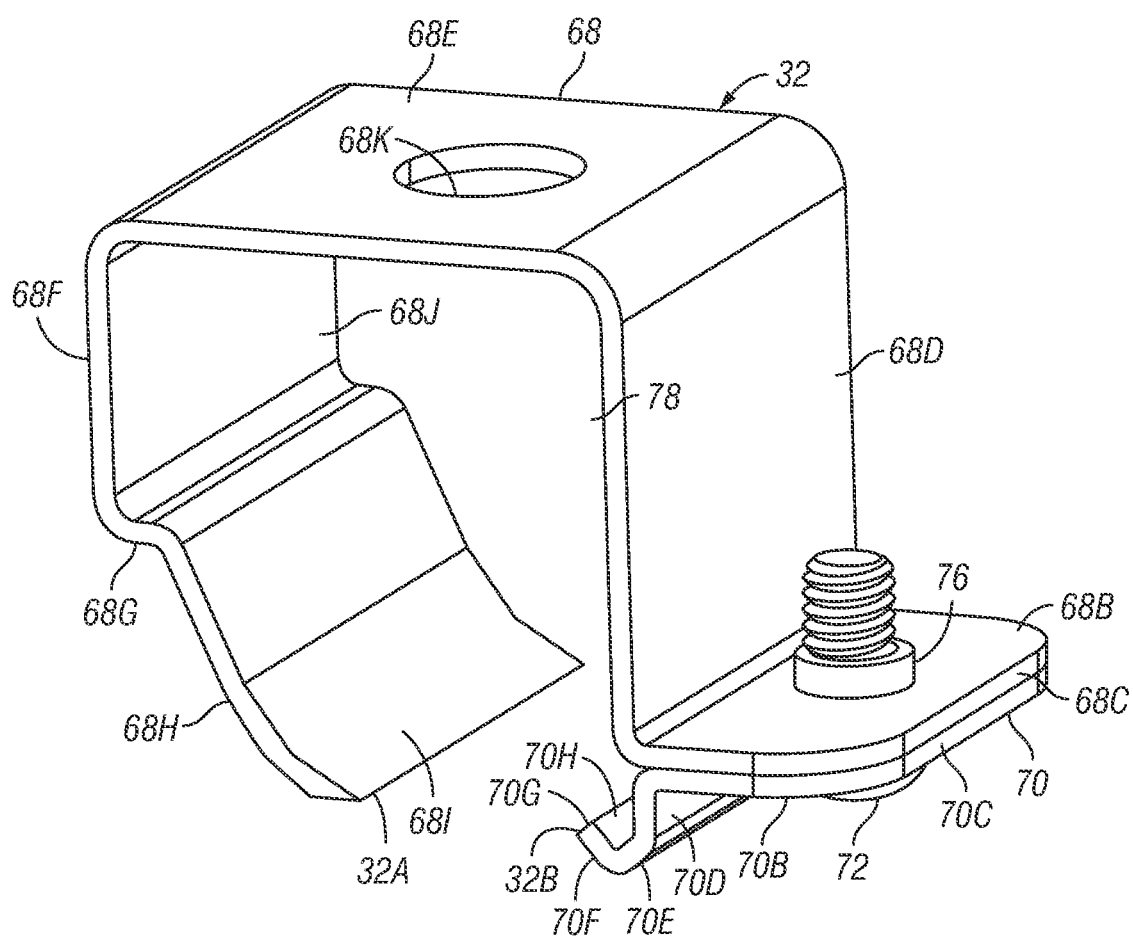
FIG. 8 is a perspective view of the light bar bracket assembly of FIG. 6.

The bracket assembly 32 includes a first bracket member 68 and a second bracket member 70, as shown in FIGS. 7-9. The first bracket member 68 includes a first fastener opening 68A and the second bracket member 70 includes a second fastener opening 70A. The first and second fastener openings 68A and 70A are configured to receive a fastener 72 to secure the second bracket member 70 to the first bracket member 68. As shown in FIGS. 5-9, the bracket assembly 32 does not extend around an entirety of the outer surface of the fixed structure 30 of the light bar 26.

The first bracket member 68 includes a first flange 68B in which the first fastener opening 68A is disposed, as shown in FIGS. 8 and 9. The fastener opening 68A has a longitudinal axis AX1. An end surface 68C of the first flange 68B is an inboard-most end of the first bracket member 68. In other words, the end surface 68C is disposed furthest inboard in the inboard direction I of the vehicle.

A first leg 68D extends substantially perpendicularly from the first flange 68B, as shown in FIGS. 8 and 9. A second leg 68E extends substantially perpendicularly from an end of the first leg 68D. A third leg 68F extends substantially perpendicularly from the second leg 68E. A fourth leg 68G extends substantially perpendicularly from an end of the third leg 68F. A flexible member 68H extends downwardly from an end of the fourth leg 68G. The end of the flexible member 68H is the first end 32A of the bracket member 32. An inner surface 68I of the flexible member 68H is angled downwardly to facilitate emitting light from the light source L1 when the bracket assembly 32 is connected to the light bar 26. The downward angle of the inner surface 68I allows an end 30C of the fixed structure 30 to be provided with a downward angle to facilitate emitting the light from the first light source L1.

The first bracket member 68 includes a first portion 68J configured to receive the first fastener receiving channel 64. The first portion 68J is defined by the second leg 68E, the third leg 68F and the fourth leg 68B, as shown in FIGS. 8 and 9. The second and third legs 68E and 68G are preferably substantially parallel. The third leg 68F is preferably substantially perpendicular to the second leg 68E and the fourth leg 68G. The first portion 68J defines a pocket configured to receive the first fastener receiving channel 64, as shown in FIG. 7.

The first bracket member 68 includes a third fastener opening 68K configured to receive a fastener 74 to secure the bracket assembly 32 to the vehicle body structure 14 of the vehicle 10, as shown in FIGS. 7 and 10. The third fastener opening 68K is disposed in the second leg 68E of the first bracket member 68. The third fastener opening 68K is disposed in the vehicle outboard direction O with respect to the first fastener opening 68A in the first flange 68B of the first bracket member 68. The third fastener opening 68K has a third longitudinal axis AX3.

The first end 32A of the bracket assembly 32 is an outboard-most end of the first bracket member 68, as shown in FIGS. 7 and 9. The end surface 68C of the first flange 68B defines an inboard-most end of the first bracket member 68.

The second bracket member 70 includes a second flange 70B in which the second fastener opening 70A is disposed, as shown in FIGS. 8 and 9. The second fastener opening has a second longitudinal axis AX2. An end surface 70C of the second flange 70B is an inboard-most end of the second bracket member 70. In other words, the end surface 70C is disposed furthest inboard in the inboard direction I of the vehicle.

A first leg 70D extends substantially perpendicularly from an outboard end of the second flange 70B, as shown in FIGS. 8 and 9. A second leg 70E extends downwardly and in the outboard direction O from an end of the first leg 70D. A third leg 70F extends upwardly and in the outboard direction O from an end of the second leg 70E. The second and third legs 70E and 70F form a substantially V-shaped member. An end surface 70G of the third leg 70F is angled downwardly to facilitate emitting light from the light source L1 when the bracket assembly 32 is connected to the light bar 26. The end surface 70G of the third leg 70F being angled downwardly allows the end 30D of the fixed structure 30 to be provided with a downward angle to facilitate emitting the light through a gap G2 defined by the ends 30C and 30D of the fixed structure 30.

The second bracket member 70 includes a second portion 70H configured to receive the second fastener receiving channel 66. The second portion 70H is defined by the first, second and third legs 70D, 70E and 70F of the second bracket member 70. The second portion 70H defines a pocket configured to receive the second fastener receiving channel 66, as shown in FIG. 7. The first portion 68J of the first bracket member 68 is disposed in the vehicle outboard direction O with respect to the second portion 70H of the second bracket member 70.

The second end 32B of the bracket assembly 32 is an outboard-most end of the second bracket member 70, as shown in FIGS. 7 and 9. The end surface 70C of the second flange 70B defines an inboard-most end of the second bracket member 70. As shown in FIGS. 8 and 9, the end face, or first face, 68C defined by an inboard-most end of the first bracket member 68 is substantially flush with the end surface, or second face, 70C defined by an inboard-most end of the second bracket member 68.

The gap G1 between the first and second ends 32A and 32B of the bracket assembly extends in a lateral direction L of the vehicle 10, as shown in FIG. 9. In other words, the gap G1 extends in a widthwise direction of the vehicle 10.

To assemble the light bar assembly 12, the fastener 74 is inserted through the third fastener opening 68K in the second leg 68E of the first bracket member 68. A nut 78 is disposed on the fastener 68 to prevent the fastener 74 from being separated from the first leg 68 of the bracket assembly 32.

The fixed structure 30 of the light bar 26 is then inserted into the cavity 78 defined by the first bracket member 68 of the bracket assembly 32. The flexible member 68H of the first bracket member 68 flexes in the outboard direction O, such that the fixed structure 30 of the light bar 26 can be rotated into the cavity 78 defined by the first bracket member 68. The first fastener receiving channel 64 and the strengthening portion 64A are received by the first portion 68J of the first bracket member 68. The first portion 68J preferably has a shape corresponding to a shape of the strengthening portion 66A.

The second bracket member 70 is then connected to the first bracket member 68 by aligning the first and second fastener openings 68A and 70A in the first and second flanges 68B and 70B of the first and second bracket members 68 and 70. The second portion 70H of the second bracket member 70 is engaged with the second fastener receiving channel 66 and the strengthening portion 66A of the fixed structure 30. The second portion 70H preferably has a shape corresponding to a shape of the strengthening portion 66A. A fastener 72 is inserted through the aligned first and second fastener openings 68A and 70A in the first and second flanges 68B and 70B of the first and second bracket members 68 and 70. A nut 76 is disposed on the fastener 72 to secure the first and second bracket members 68 and 70 together. The first and second longitudinal axes AX1 and AX2 are coincident, as shown in FIG. 9. The third longitudinal axis AX3 is substantially parallel to each of the first and second longitudinal axes AX1 and AX2. The process is repeated for each bracket assembly 32 connected to the light bar 26.

As shown in FIG. 10, a bracket 82 can be disposed between the vehicle body structure 14 and the bracket assembly 32 to secure the light bar 26 and the projector 28 of the light bar assembly 12 to the vehicle 10. Alternatively, the fastener 74 is connected to the rocker panel, or sill, 20 of the vehicle body structure 14 to secure the light bar 26 and the projector 28 of the light bar assembly 12 to the vehicle 10. The fastener 74 can be directly fastened to a component of the vehicle body structure 14, as shown in FIG. 7. As shown in FIGS. 1-3, three bracket assemblies 32 are used to secure the light bar assembly 12 to the vehicle body structure 14, although any suitable number of bracket assemblies 32 can be used. The bracket assembly 32 can be connected to the fixed structure 30 of the light bar 26 at a longitudinal location in which a light source L1 is disposed.

As shown in FIG. 7, a second gap G2 is defined between ends 30C and 30D of the fixed structure 30. The gap G2 extends in the longitudinal direction of the vehicle 10 preferably for an entirety of the length of the fixed structure 30. The gap G2 of the fixed structure 30 is smaller in the vehicle lateral direction L than the gap G1 between the ends 32A and 32B of the bracket assembly 32. The bracket assembly 32 secures the light bar assembly 12 to the vehicle, and substantially reduces interference with the light emitted by the light source L1 of the light bar 26.

Second Embodiment

Referring now to FIGS. 11-19, a light bar assembly 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Figure 11:
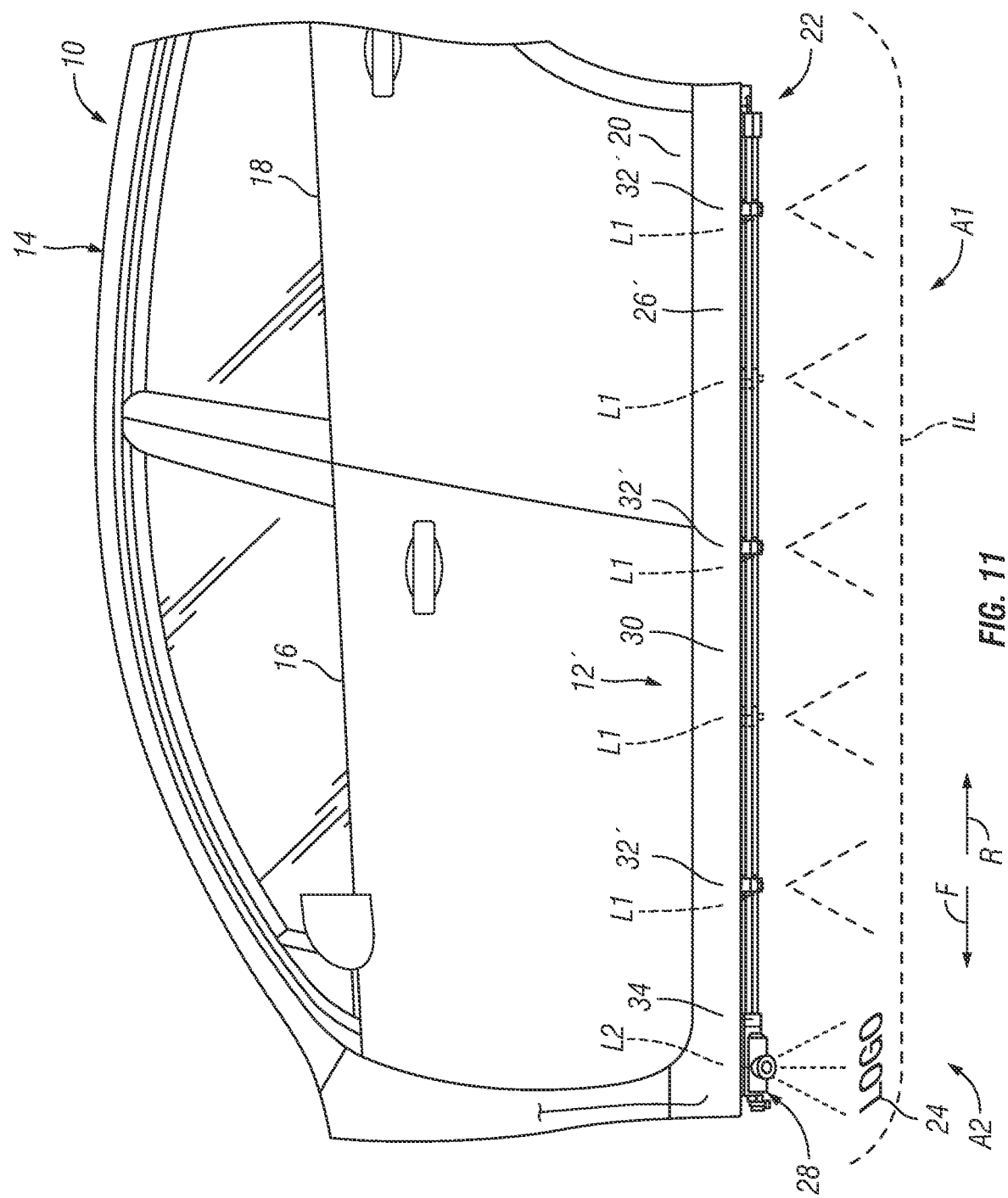
FIG. 11 is a side elevational view of a vehicle light assembly including a vehicle light bar bracket assembly in accordance with a second embodiment.
Figure 12:
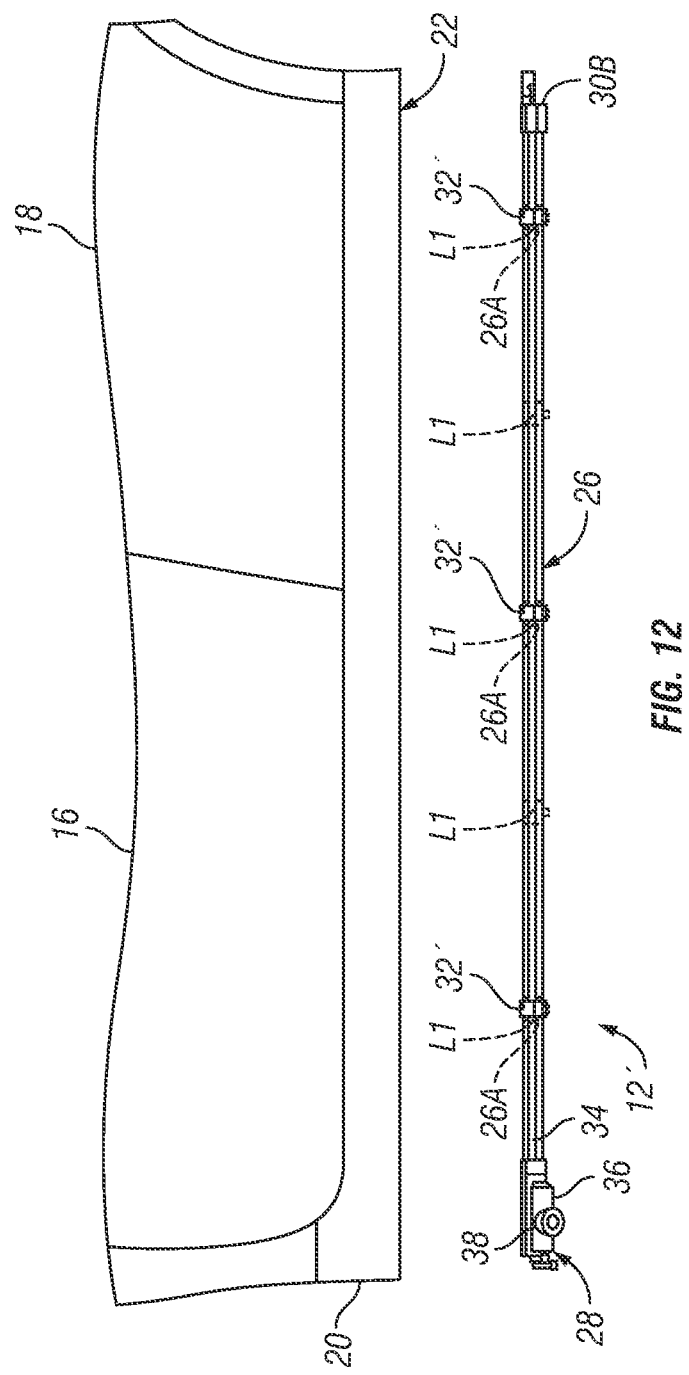
FIG. 12 is an exploded side elevational view of the vehicle of FIG. 11 prior to installation of the vehicle light assembly to the vehicle.

As shown in FIGS. 11 and 12, the light bar assembly 12' includes the light bar 26, the image projector 28 and the fixed structure 30 of the first embodiment. Here, the light bar assembly 12' further includes at least one bracket assembly 32'. The fixed structure 30 is connected to the rocker panel 20 by the at least one bracket assembly 32'. Here, three of the bracket assemblies 32' are used. The bracket assemblies 32 can be referred to as a first bracket assembly, a second bracket assembly and a third bracket assembly. Here, the bracket assemblies 32' are all identical. However, the bracket assemblies 32' can be different if needed and/or desired. Here, the bracket assemblies 32' are equidistantly spaced along the fixed structure 30 of the light bar 26. The number of the bracket assemblies 32' can vary depending on the vehicle and or the desired effect. Basically, the light bar assembly 12' is detachably mounted to the rocker panel 20 on the underbody 22 of the vehicle 10 by the bracket assemblies 32'.

Figure 13:
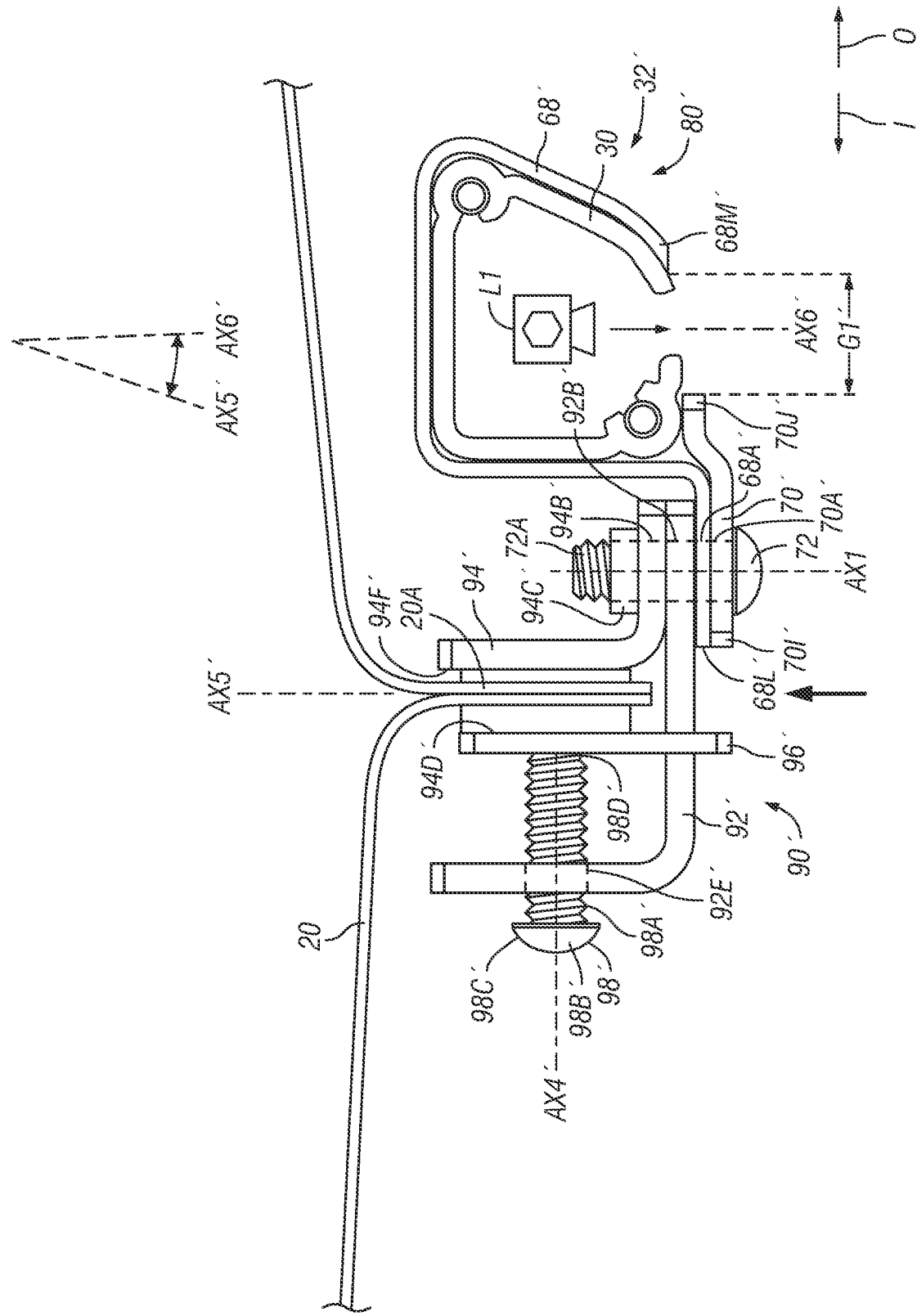
FIG. 13 is a cross sectional view of the vehicle light assembly connected to a vehicle rocker of the vehicle of FIG. 11.
Figure 14:
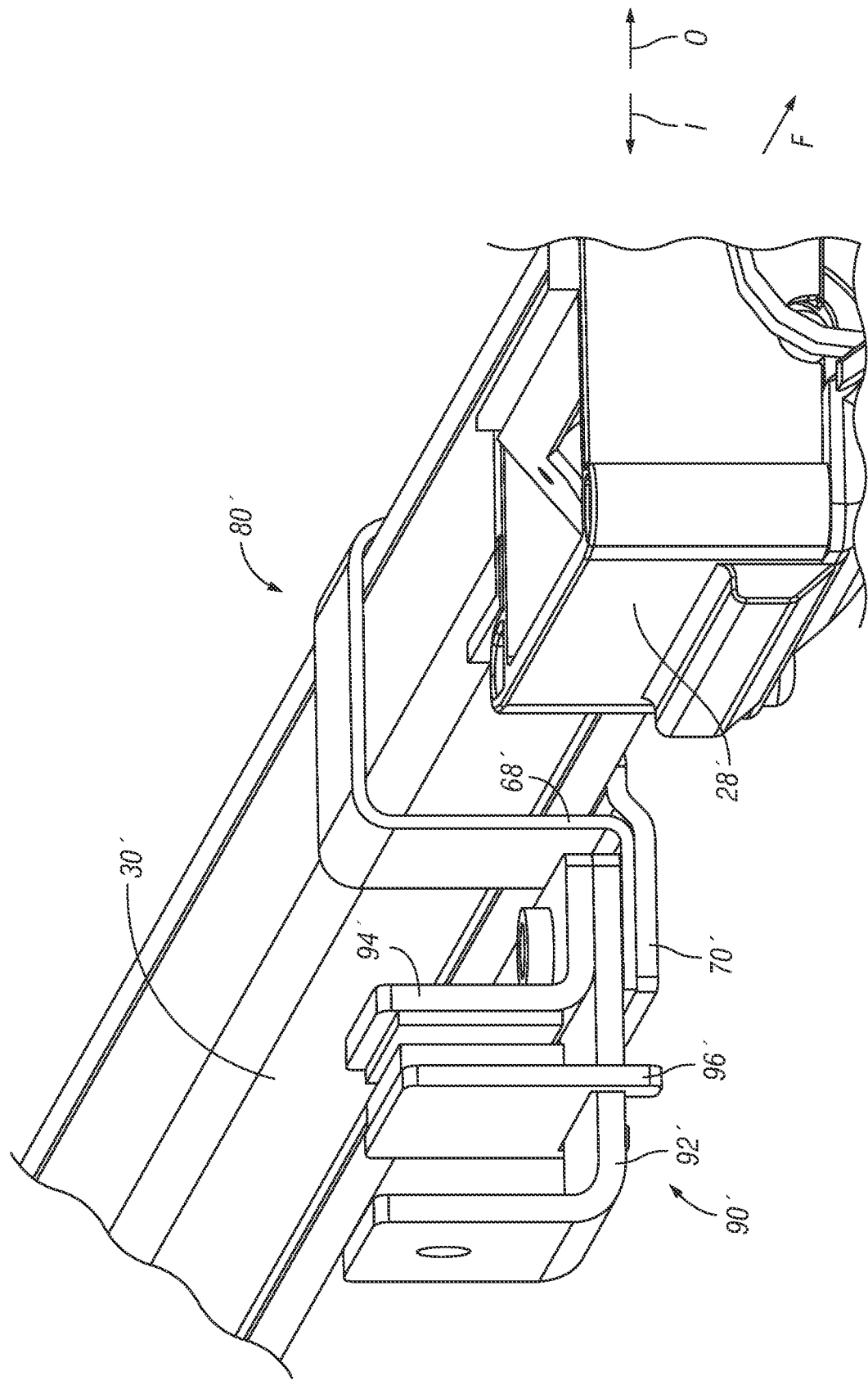
FIG. 14 is a perspective view of the light bar connected to the bracket assembly of FIG. 13.
Figure 16:
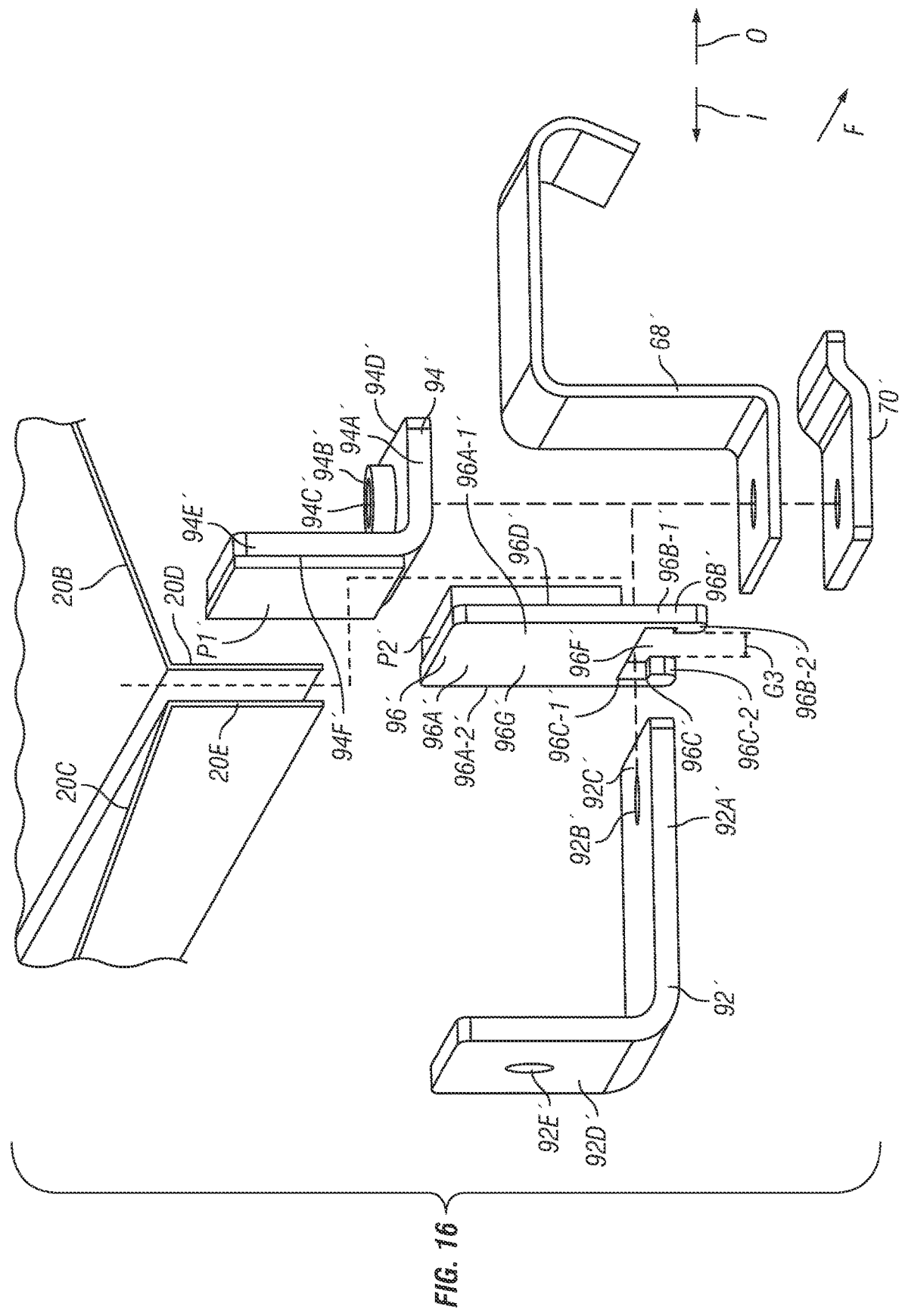
FIG. 16 is an exploded perspective view of the bracket assembly of FIG. 13.
Figure 17:
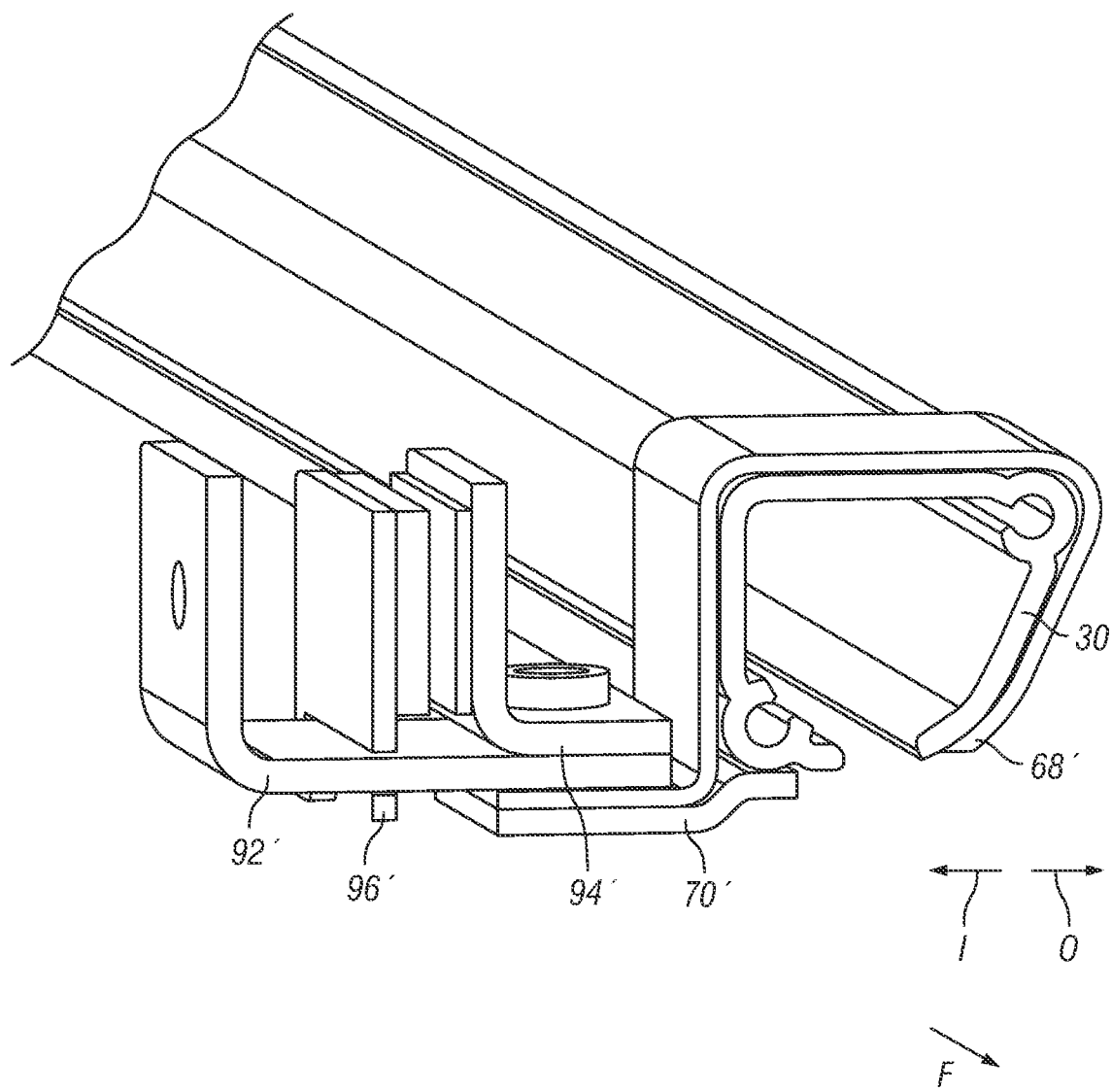
FIG. 17 is a perspective view of the light bar connected to the bracket assembly of FIG. 13.

As shown in FIGS. 11-13, each of the bracket assembly 32' includes a (first, second, or third) light bar receiving portion 80' and a (first, second, or third) rocker attachment portion 90'. As shown in FIGS. 13 and 16, the light bar receiving portion 80' includes a first bracket member 68' and a second bracket member 70'. The first bracket member 68' and the second bracket member 70' are configured to define a light bar receiving area 80a'. The light bar receiving area 80a' receives the light bar 26. The first bracket member 68' partially surrounds the light bar 26. The second bracket member 70' is attached to the first bracket member 68' and contacts the light bar 26. Also, the light bar receiving portion 80' is outboard of the rocker attachment portion 90' in a state where the light bar assembly 12' is attached to the vehicle rocker panel 20 via the rocker attachment portion 90'.

The first bracket member 68' has a first end 68L' and a second end 68M'. The second bracket member 70' has a first end 70I' and a second end 70J'. The first end 68L' of the first bracket member 68' and the first end 70I' of the second bracket member 70' are attached together. The second end 68M' of the first bracket member 68' and the second end 70J' of the second bracket member 70' are spaced apart by a gap G1'. The light bar 26 in the light bar receiving area 80a' projects light from the light source L1 downwardly through the gap G1'.

Figure 15:
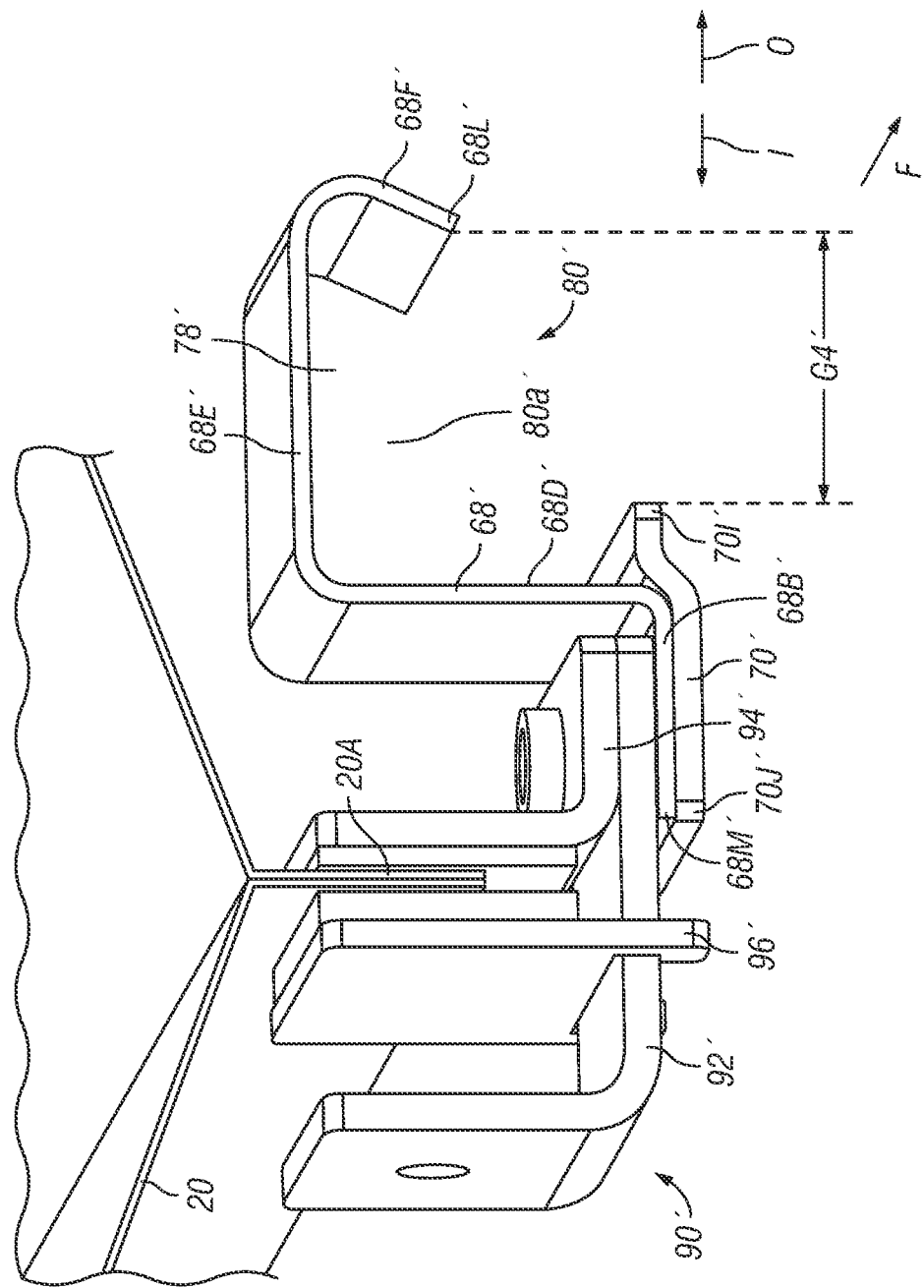
FIG. 15 is an assembled perspective view of the bracket assembly of FIG. 13.

In addition, the first bracket member 68' of FIG. 13 includes a first flange 68B', a first leg 68D', a second leg 68E' and a flexible third leg 68F' (Legs numbered in FIG. 15). Alternatively, while the FIG. 13 shows the first bracket member 68' includes a third leg 68F'' that is flexible, the first bracket member 68' can include a shorter third leg 68F' as shown in FIGS. 15-16. Also, the second end 68M' of the first bracket member 68' and the second end 70J' of the second bracket member 70' are spaced apart by a larger gap G4'. The shorter third leg 68F' does not need to flex in the outboard direction O as much and the fixed structure 30 of the light bar 26 can be rotated into the cavity 78' defined by the first bracket member 68' more easily.

As shown in FIGS. 13 and 16, the rocker attachment portion 90' includes a support part 92', a first clamping part 94' and a second clamping part 96'. The support part 92' includes a mounting section 92A' in which the fourth fastener opening 92B' is disposed. As shown in FIG. 16, an end surface 92C' of the mounting section 92A' is the outboard-most end of the support part 92'. A support section 92D' of the support part 92' extends substantially perpendicular from the mounting section 92A'. The support section 92D' of the support part 92' includes a sixth fastener opening 92E' as shown in FIGS. 13 and 16. The sixth fastener opening 92E' is threaded. The sixth fastener opening 92E' has a longitudinal axis AX4'.

As shown in FIGS. 13 and 16, the rocker attachment portion 90' further includes the first clamping part 94'. The first clamping part 94' includes a mounting section 94A' in which the fifth fastener opening 94B' is disposed. An end surface 94D' of the mounting section 94A' is the outboardmost end of the first clamping part 94'. A clamping section 94E' of the first clamping part 94' extends substantially perpendicular from the mounting section 94A'. As shown in FIGS. 13 and 16, the mounting section 94A' of the first clamping part 94' and the mounting section 92A' of the support part 92' are attached together.

As shown in FIG. 13, the rocker attachment portion 90' further includes the second clamping part 96'. Second clamping part 96' includes an aperture 96F'. The aperture 96F' receives a portion of the support section 92A' of support part 92'. Accordingly, the second clamping part 96' is slidably supported on the support part 92'. In other words, the support part 92' slidably supporting the second clamping part 96'.

Figure 18:
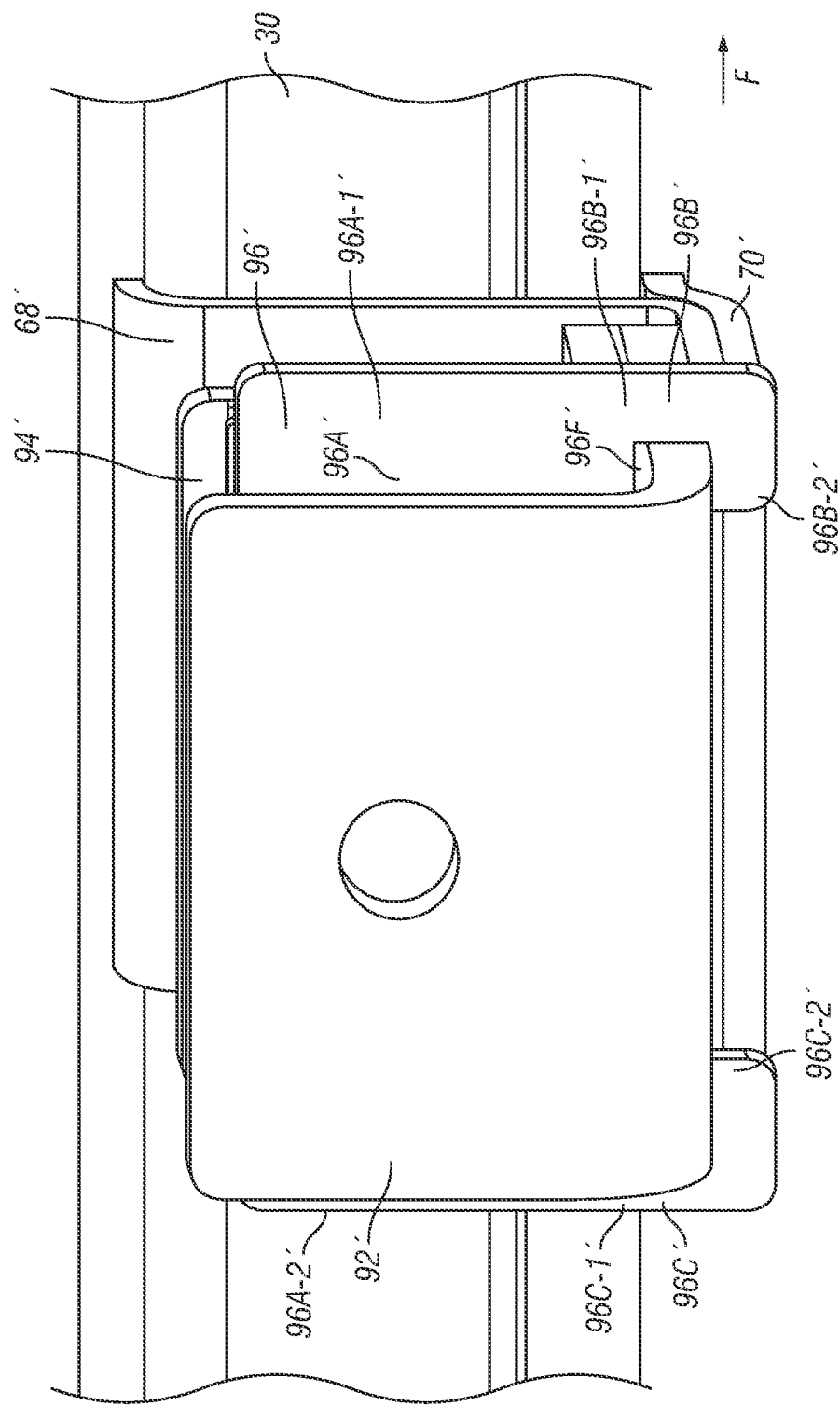
FIG. 18 is a perspective view of the light bar connected to the bracket assembly of FIG. 13.
Figure 19:
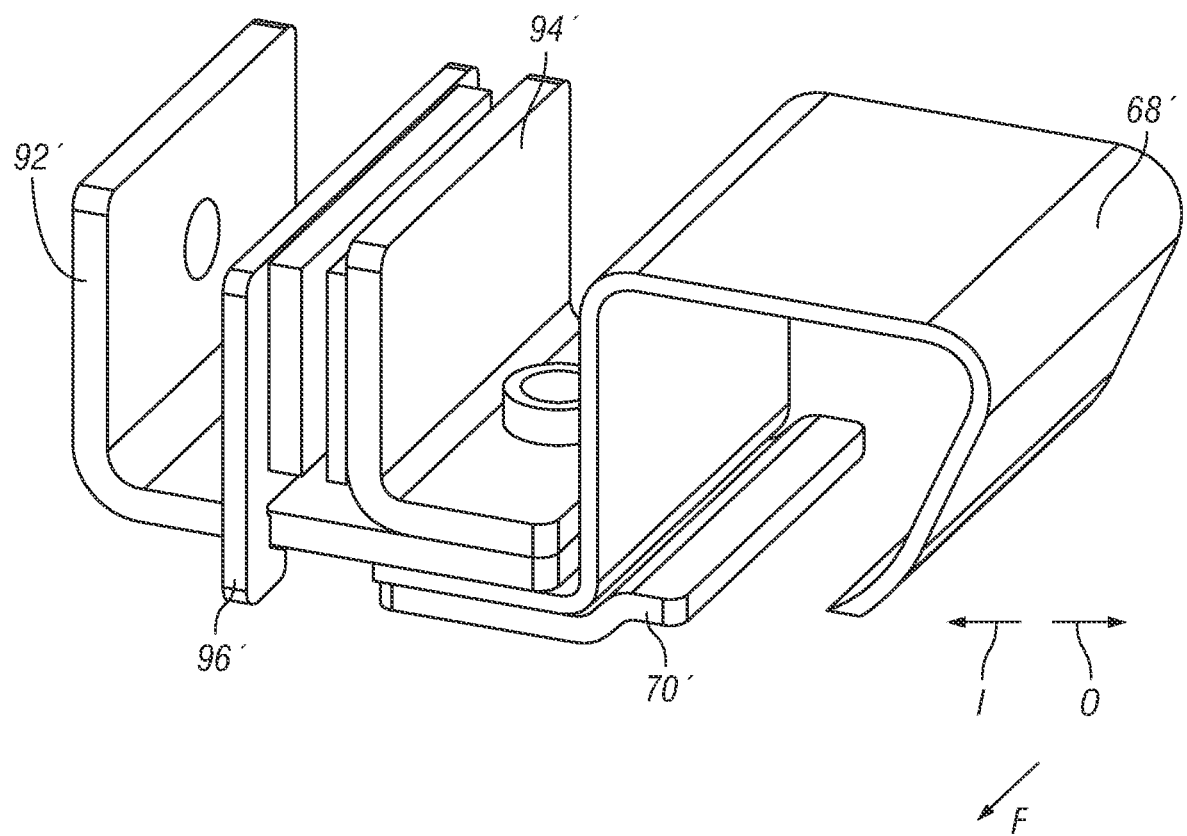
FIG. 19 is a perspective view of the bracket assembly of FIG. 13.

As shown in FIGS. 16 and 18, the second clamping part 96' includes a body 96A', a first L shaped leg 96B' and a second L shaped leg 96C'. The body 96A' of the second clamping part 96' has a first end 96A-1' and a second end 96A-2'. A first end 96B-1' of the first L shaped leg 96B' is attached to the first end 96A-1' of the body 96A'. The first end 96B-1' of the first L shaped leg 96B' extends substantially perpendicularly from the first end 96A-1' of the body 96A'. A first end 96C-1' of the second L shaped leg 96C' is attached to the second end 96A-2' of the body 96A'. The first end 96C-1' of the second L shaped leg 96C' extends substantially perpendicularly from the second end 96A-2' of the body 96A', as shown in FIG. 16. Accordingly, the first L shaped leg 96B' and the second L shaped leg 96C' extend from opposite ends of the body 96A' in the same direction. The second end 96B-2' of the first L shaped leg 96B' and the second end 96C-2' of the second L shaped leg 96C' are oppositely facing. Accordingly, oppositely facing second end 96B-2' of the first L shaped leg 96B' and second end 96C-2' of the second L shaped leg 96C' define a gap G3'. The oppositely facing first L shaped leg 96B' and second L shaped leg 96C' form the aperture 96F' of the second clamping part 96'. As stated above, the aperture 96F' of the second clamping part 96' receives a portion of the mounting section 92A' of the support part 92'. The first L shaped leg 96B' and the second L shaped leg 96C' retain the second clamping part 96' on the support part 92'. The aperture 96F' in the second clamping part 96' is easier to stamp than a more conventional opening and saves weight. Alternatively, while the FIG. 16 shows the second end 96B-2' and the second end 96C-2' do not contact each other, the second end 96B-2' and the second end 96C-2' can contact each other and form a unitary wall. This unitary wall allows aperture 96F' to become a slot or other shape.

To assemble bracket assembly 32', the first end 68L' of the first bracket member 68', the first end 70I' of the second bracket member 70', the mounting section 92A' of the support part 92' and the mounting section 94A' of the first clamping part 94' are attached together by the fastener 72. As described above, the first end 68L' of the first bracket member 68' has a first fastener opening 68A'. The first end 70I' of the second bracket member 70' has a second fastener opening 70A'. The support part 92' includes a mounting section 92A' with a fourth fastener opening 92B' and the first clamping part 94' includes a mounting section 94A' with a fifth threaded fastener opening 94B'. Thus, the first fastener opening 68A', the second fastener opening 70A', the fourth fastener opening 92B' and the fifth threaded fastener opening 94' are configured to receive a fastener 72 to secure the first bracket member 68', the second bracket member 70', the first clamping part 94' and the support part 92' together. The threads of the threaded shaft 72A' of the fastener 72 engage the treads of the threaded fifth fastener opening 94B' of the first clamping part 94'.

As shown in FIGS. 13 and 16, the mounting section 94A' of the first clamping part 94' includes a nut 94C' above the threaded fifth fastener opening 94B'. The nut 94C' includes additional threads to engage the fastener 72. An adhesive between the fastener 72 and the threads of the fifth fastener opening 94B' of the first clamping part 94' fixes the fastener 72 to the first clamping part 94'. Additional adhesive between the fastener 72 and the nut 94C' can further fix the fastener 72 to the first clamping part nut 94C'. The first fastener opening 68A', the second fastener opening 70A', the fourth fastener opening 92B' and the fifth fastener opening 94B' have a longitudinal axis AX1. Alternatively, while the first clamping part 94' is shown in FIG. 13 to include the nut 94C', the nut 94C' could be replaced with an integral extruded nut, with a nut that is welded to the first clamping part 94' or by eliminating the nut 94C'.

As shown in FIG. 13, the first bracket member 68', the second bracket member 70', the first clamping part 94', and the second clamping part 94' are separate and distinct brackets. Alternatively, while the first bracket member 68', the second bracket member 70', the first clamping part 94' and the support part 92' are shown in FIG. 13 as separate parts, the first clamping part 94' and the support part 92' could be made as a single, monolithic, part. Further, any two, three or four of these parts could be made as a single, monolithic, part.

As shown in FIGS. 13-19, the rocker attachment portion 90' is configured to receive the rocker panel flange 20A of the vehicle rocker panel 20. As shown in FIG. 16, the vehicle rocker panel 20 includes the first rocker panel section 20B and a second rocker panel section 20C. The first rocker panel section 20B includes a downwardly extending first wall 20D and the second rocker panel section 20C includes a downwardly extending second wall 20E. The first wall 20D and second wall 20E are configured to receive welds to secure the first wall 20D to the second wall 20E. The assembled first wall 20D and the second wall 20E define the rocker flange 20A. Alternatively, while the vehicle rocker panel 20 is shown in FIG. 16 as an assembly of a first rocker panel section 20B and a second rocker panel section 20C, the vehicle rocker panel 20 and the rocker panel flange 20A could be a single, monolithic rocker. A monolithic rocker panel 20 could be formed by extruded metal, molded plastic, etc.

The first rocker attachment portion 90' is configured to clamp the vehicle rocker 20 between the second clamping part 96' and one of the first support part 92' and the first clamping part 94'. One of the clamping section 94E' of the first clamping part 94' and the support section 92D' of the support part 92' includes a threaded sixth fastener opening 92E'. The threaded shaft 98A' of the expander 98' is received in the threaded sixth fastener opening 92E'. As seen in FIG. 13, the rocker attachment portion 90' includes the expander 98' positioned between the support part 92' and the second clamping part 96'. In this option, the expander 98' is received in the threaded sixth fastener opening 92E' of the support part 92'. The threaded shaft 98A' of the expander 98' includes a head 98B' on a first end 98C'. A second end 98D' of the expander 98' extends from the support part 92' toward the second side 96G' of the second clamping part 96'. The second side 96G' of the second clamping part 96' is opposite the first side 96D' of the second clamping part 96'. The vehicle rocker panel flange 20A is between the second clamping part 96' and the first clamping part 94'. The first clamping part 94' and the first side 96D' of the second clamping part 96' are configured to clamp to the vehicle rocker panel flange 20A in response to the expansion of the expander 98'. In other words, the expander 98' includes a threaded fastener threadedly engaged with the threaded sixth fastener opening 92E', and applies a clamping force to the second clamping part 96'.

As shown in FIG. 13, rocker panel flange 20A extends in an axis AX5'. Light from light source L1 extends in an axis AX6'. The angle between axis AX6' and the horizontal plane is substantially 90 degrees. The angle between axis AX5' and AX6' is a predetermined angle A1'. The predetermined angle A1' is preferably between 0 and 30 degrees. Bracket assembly 32' is configured to attach to rocker panel flange 20A and bracket assembly 32' is configured to direct the light from light source L1 at the predetermined angle. Many vehicles have a vertically oriented rocker panel flange 20A and bracket assembly 32' can be used on many vehicles to project light at the predetermined angle.

In a second option (not shown), the expander 98' is received in the threaded sixth fastener opening 92E' in the clamping section 94E' of the first clamping part 94'. The head 98B' of the expander 98' is positioned between the light bar receiving portion 80 and the rocker attachment portion 90'. The threaded shaft 98A' of the expander 98' extends in substantially parallel relation to the support section 92D' of the support part 92'. Further, the threaded shaft 98A' of the expander 98' extends in substantially parallel relation to axis AX4' shown in FIG. 13. Axis AX4' of the fastener opening 92E' is substantially perpendicular to axis AX1 of fastener opening 70A'. The second end 98D' of the expander 98' contacting the first side 96D' of the second clamping part 96'. The rocker panel flange 20A is positioned between the support section 92D' and the second side 96G' of the second clamping part 96'. Thus, the rocker flange 20A is clamped between the support part 92' and the second side 96G' of the second clamping part 96'.

An adhesive fixes the expander 98' to the sixth fastener opening 92E' in one of the support section 92D' and the clamping section 94E'. The adhesive can be any material including Loctite®. Alternatively, while the FIG. 13 shows the expander 98' as a bolt, the expander 98' can be other common fasteners including a screw, a plastic clip, etc.

In the first option, the first clamping part 94' includes a first elastomeric pad P1', and the second clamping 96' part includes a second elastomeric pad P2' that faces the first elastomeric pad P1'. In other words, the side of the clamping section 94E' that faces the support section 92D' includes a first elastomeric pad P1'. The first side 96D' of the second clamping part 92' includes a second elastomeric pad P2'. In the second option, the side of the support section 92D' that faces the clamping section 94E' includes a first elastomeric pad P1'. The second side 96G' of the second clamping part 92' includes a second elastomeric pad P2'. The first pad P1' and the second pad P2' can be made of any convention material including stiff rubber, plastic, etc. The first elastomeric pad P1' and the second elastomeric pad P2' prevent the first clamping part 94' and the second clamping part 96' from cracking the protective paint coating on the rocker panel flange 20A and exposing the rocker panel flange 20A to contaminants that can cause rust.

The first clamping part 94' has a first thickness. The second clamping part 96' has a second thickness. The support part 92' has a third thickness. The second bracket member 70' has a fourth thickness. The first bracket member 68' has a fifth thickness. The fifth thickness is less than each of the first thickness and third thickness. The first and third thicknesses are preferably between 1.5-5.5 mm. The fifth thickness is preferably between 0.5-2.5 mm. The first clamping part 94', the second clamping part 96', the support part 92' and the second clamping part 96' can be made of any material including general steel or plastic. The first bracket member 68' can be made of any material including spring steel, general steel or plastic. In addition, the first bracket member 68', the second bracket member 70', the first clamping part 94', the support part 92' and the second clamping part 96' are bent plate members.

To assemble the light bar assembly 12', the fixed structure 30 of the light bar 26 is inserted into the cavity 78' defined by the first bracket member 68' of the bracket assembly 32'. The flexible member 68F' of the first bracket member 68' flexes in the outboard direction O, such that the fixed structure 30 of the light bar 26 can be rotated into the cavity 78' defined by the first bracket member 68'. The second bracket member 70' is positioned to overlay a portion of fixed structure 30. The second end 70J' of the second bracket member 70' is engaged with the second fastener receiving channel 66.

Then, the support part 92' is inserted into the aperture 96F" of the second clamping part 96' such that a second side 96G' of the second clamping part 96' faces with the sixth fastener opening 92E' of the support part 92'. The second bracket member 70', the first bracket member 68', the support part 92' and the first clamping part 94' are positioned to be connected together. The first fastener opening 96A', the second fastener opening 70A', the fourth fastener opening 92B' and the fifth fastener opening 94B' are aligned. The fastener 72 is inserted through the first fastener opening 96A', the second fastener opening 70A', the fourth fastener opening 92B' and the fifth fastener opening 94B', which are aligned. The fastener 72' is received in the threaded fifth fastener opening 94B' of the first clamping part 94'. An adhesive between the fastener 72 and the threaded fifth fastener opening 94B' of the first clamping part 94' fixes the fastener 72 to the first clamping part 94'.

The expander 98' is then inserted through the sixth fastener opening 92E' of the support part 92'. The second end of the expander 98' contacts the second side 96G' of the second clamping part 96'. A first elastomeric pad P1' is adhered the surface of the first clamping part 94' that faces support section 92D' of the support part 92'. A second elastomeric pad P2' is adhered the first surface 96D' of the second clamping part 96'. The first bracket assembly 32' receives the rocker panel flange 20A between the first clamping part 94' and the second clamping part 96'. The second clamping part 96' is moved into position against the rocker panel flange 20A and the expander 98' expands to push the second clamping part 96' against the rocker panel flange 20A.

The process is repeated for each of the bracket assemblies 32' connected to the light bar 26. In other words, the second bracket assembly 32' having the second light bar receiving portion 80' configured to receive a second portion of the light bar 26 and the second rocker attachment portion 90' configured to receive a second portion of the vehicle rocker panel 20.

Third Embodiment

Figure 20:
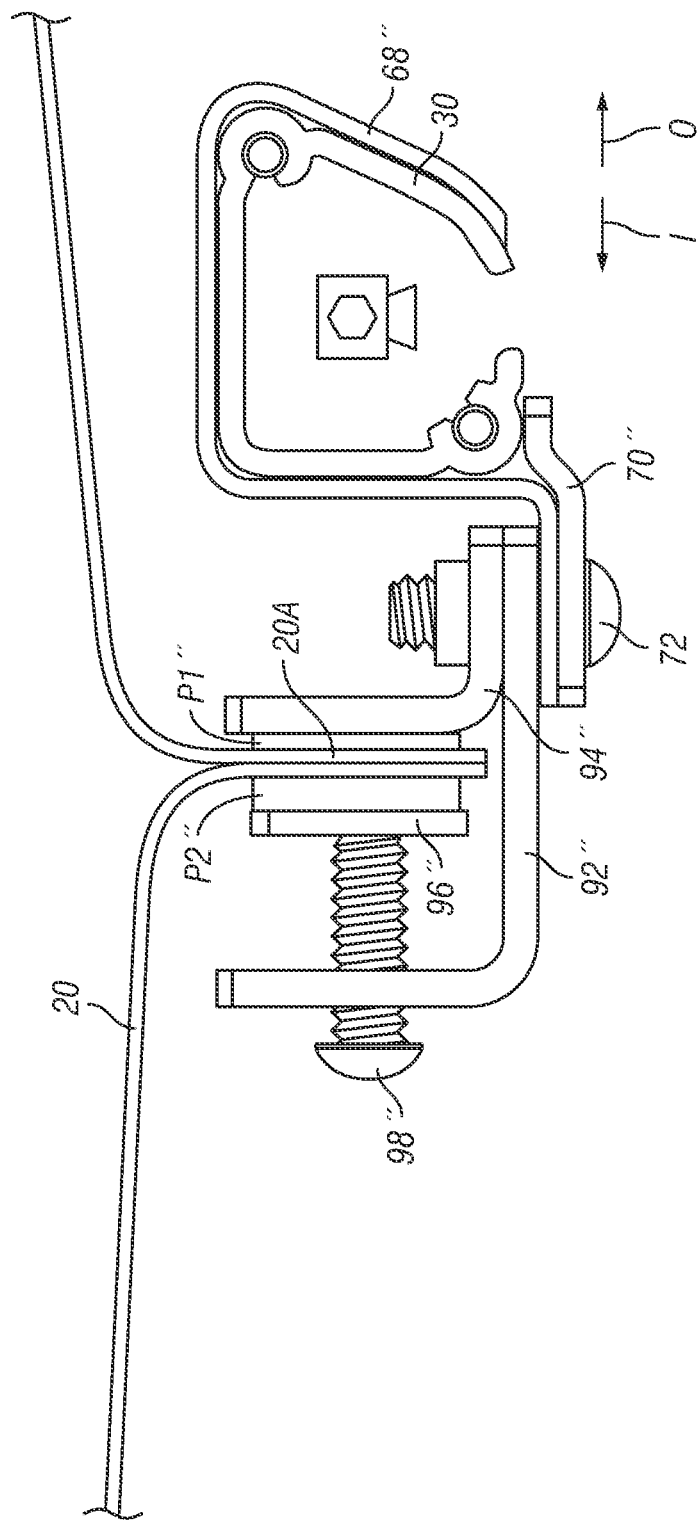
FIG. 20 is a cross sectional view of a vehicle light assembly connected to a vehicle rocker of a vehicle in accordance with a third embodiment.

Referring now to FIG. 20, a light bar assembly 12" in accordance with a third embodiment will now be explained.

In view of the similarity between the first, second and third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiments may be omitted for the sake of brevity. The parts of the third embodiment that differ from the parts of the first and second embodiments will be indicated with a double prime ("). As shown in FIG. 20, the light bar assembly 12" includes the light bar 26, the image projector 28 and the fixed structure 30 of the first embodiment. Here, the light bar assembly 12" further includes at least one bracket assembly 32". The fixed structure 30 is connected to the rocker panel 20 by the at least one bracket assembly 32". Here, three of the bracket assemblies 32" are used. The bracket assemblies 32" can be referred to a first bracket assembly, a second bracket assembly and a third bracket assembly. Here, the bracket assemblies 32" are all identical. However, the bracket assemblies 32" can be different if needed and/or desired. Here, the bracket assemblies 32" are equidistantly spaced along the fixed structure 30 of the light bar 26. The number of the bracket assemblies 32" can vary depending on the vehicle and or the desired effect. Basically, the light bar assembly 12' is detachably mounted to the rocker panel 20 on the underbody 22 of the vehicle 10 by the bracket assemblies 32".

As shown in FIG. 20, the rocker attachment portion 90" includes a first clamping part 94", a support part 92" and an expander 98". In the first option shown in FIG. 20, the support part 92" extendably supports the expander 98". Here, the support part 92" includes a threaded sixth fastener opening 92E". The threaded shaft of the expander 98" is received in the threaded sixth fastener opening 92E" of the support part 92".

The expander 98" includes a threaded shaft 98A" with a head 98B" at a first end 98C" and a second clamping part 96" at the second end 98D". The second clamping part 96" is fixedly attached to the second end 98D" of the threaded shaft 98A". The first clamping part 94" and the expander 98" are configured to clamp to the vehicle rocker panel flange 20A" in response to the expansion of the expander 98". An adhesive between the expander 98" and the threaded sixth fastener opening 92E" of the support part 92" fixes the expander 98" relative to the support part 92". The adhesive can be any material including Loctite®. Alternatively, while FIG. 20 shows the expander 98" as a bolt, the expander 98" can be other common fasteners including a screw, a plastic clip, etc.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the light bar assembly. Accordingly, these terms, as utilized to describe the present invention should be interpreted relative to a vehicle equipped with the light bar assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents. Outboard arrow O and inboard arrow I point to the outboard direction of the vehicle and the inboard direction a vehicle, respectively. These directions are in reference to a vertical plane passing through a center line of the vehicle. The centerline extends from the front of the vehicle to the rear of the vehicle and the centerline is equally spaced laterally from the two sides of the vehicle. For example, a first part is outboard of a second part if the first part is further from the vertical plane of the vehicle than the second part. In addition, a first part is inboard of a second part if the first part is closer to the vertical plane of the vehicle than the second part. A forward arrow F points to the front of the vehicle.

What is claimed is:

1. A light bar assembly for a vehicle, the light bar assembly comprising:
   a light bar configured to receive a light source; and
   a first bracket assembly including a first light bar receiving portion and a first rocker attachment portion;
   the first light bar receiving portion receiving a first portion of the light bar,
   the first rocker attachment portion being configured to receive a first portion of a vehicle rocker;
   the first light bar receiving portion includes a first bracket member and a second bracket member, the first bracket member and the second bracket member are configured to define a light bar receiving area;
   the first bracket member partially surrounds the light bar, and the second bracket member is attached to the first bracket member and contacts the light bar;
   the first bracket member has a first end and a second end, the second bracket member has a first end and a second end, the first end of the first and second bracket member are attached together, the second end of the first and second bracket member are spaced apart by a gap.

2. The light bar assembly of claim 1, wherein
the first rocker attachment portion includes a first clamping part and a second clamping part, the first clamping part and the second clamping part are configured to clamp to the vehicle rocker.

3. The light bar assembly of claim 2, wherein
the first clamping part and the second clamping part are configured to clamp to a rocker flange of the vehicle rocker.

4. The light bar assembly of claim 1, further comprising a second bracket assembly having a second light bar receiving portion configured to receive a second portion of the light bar and a second rocker attachment portion configured to receive a second portion of the vehicle rocker.

5. The light bar assembly of claim 2, wherein
the first rocker attachment portion includes a first clamping part and a second clamping part, the first clamping part and the second clamping part are configured to clamp the vehicle rocker.

6. The light bar assembly of claim 5, wherein
the first bracket member, the first clamping part, and the second clamping part are bent plate members, the first clamping part has a first thickness, the support part has a third thickness, the first bracket member has a fifth thickness, the fifth thickness is less than each of the first thickness and third thickness.

7. The light bar assembly of claim 5, wherein
the first bracket member, the second bracket member, the first clamping part, and the second clamping part are separate and distinct brackets.

8. The light bar assembly of claim 2, wherein
the first rocker attachment portion includes a support part, the second clamping part is slidably supported on the support part.

9. The light bar assembly of claim 8, wherein
the first rocker attachment portion further includes an expander positioned between the support part and the second clamping part.

10. The light bar assembly of claim 7, wherein
the support part includes a threaded fastener opening, and
the expander includes a threaded fastener threadedly engaged with the threaded fastener opening, and applies a clamping force to the second clamping part.

11. The light bar assembly of claim 1, wherein
the first light bar receiving portion is outboard of the first rocker attachment portion in a state where the light bar assembly is attached to the vehicle rocker panel via the first rocker attachment portion.

12. The light bar assembly of claim 1, wherein
the first rocker attachment portion includes a first clamping part, a second clamping part movable relative to the first clamping part, a support part slidably supporting the second clamping part and an expander positioned between the support part and the second clamping part, the first clamping part and the second clamping part are configured to clamp to the vehicle rocker in response to expansion of the expander.

13. The light bar assembly of claim 1, wherein
the first clamping part has a mounting section,
the support part has a mounting section, and
the mounting sections of the first clamping part and the support part are attached together.

14. The light bar assembly of claim 13, wherein
the first end of the first and second bracket member and the mounting sections of the first clamping part and the support part are attached together by a fastener.

15. The light bar assembly of claim 12, wherein
the first clamping part includes a first elastomeric pad, and
the second clamping part includes a second elastomeric pad that faces the first elastomeric pad.

16. The light bar assembly of claim 1, wherein
the first rocker attachment portion includes a first clamping part, a second clamping part and a support part, the first rocker attachment portion is configured to clamp the vehicle rocker between the second clamping part and one of the first support part and the first clamping part.

17. The light bar assembly of claim 16, wherein
the expander is received in the threaded sixth fastener opening of the first clamping part and the vehicle rocker is between the second clamping part and the first support part.

18. The light bar assembly of claim 16, wherein
the expander is received in the threaded sixth fastener opening of the support part and the vehicle rocker is between the second clamping part and the first clamping part.

* * * * *